(12) United States Patent
Kadoi et al.

(10) Patent No.: US 11,451,719 B2
(45) Date of Patent: Sep. 20, 2022

(54) IMAGE PROCESSING APPARATUS, IMAGE CAPTURE APPARATUS, AND IMAGE PROCESSING METHOD

(71) Applicant: CANON KABUSHIKI KAISHA, Tokyo (JP)

(72) Inventors: Hideki Kadoi, Tokyo (JP); Ryosuke Takahashi, Kanagawa (JP); Hiroaki Kuchiki, Chiba (JP); Akimitsu Yoshida, Tokyo (JP); Kohei Furuya, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 82 days.

(21) Appl. No.: 17/184,003

(22) Filed: Feb. 24, 2021

(65) Prior Publication Data

US 2021/0274102 A1 Sep. 2, 2021

(30) Foreign Application Priority Data

Feb. 28, 2020 (JP) .............................. JP2020-033750

(51) Int. Cl.
*H04N 5/243* (2006.01)
*H04N 5/235* (2006.01)
(Continued)

(52) U.S. Cl.
CPC .............. *H04N 5/243* (2013.01); *G06T 7/90* (2017.01); *G06T 11/001* (2013.01);
(Continued)

(58) Field of Classification Search
CPC .... H04N 9/735; H04N 9/3182; H04N 1/6077; H04N 1/6086; H04N 5/2351; H04N 5/2256
See application file for complete search history.

(56) References Cited

U.S. PATENT DOCUMENTS

| 4,965,840 | A | 10/1990 | Subbarao |
| 9,723,285 | B2 * | 8/2017 | Yoshizaki .............. H04N 9/735 |

(Continued)

FOREIGN PATENT DOCUMENTS

| CN | 107959851 A | * | 4/2018 | ............. H04N 17/02 |
| JP | 2002271638 A | | 9/2002 | |

(Continued)

*Primary Examiner* — John Villecco
(74) *Attorney, Agent, or Firm* — Rossi, Kimms & McDowell LLP

(57) ABSTRACT

An image processing apparatus that generates, from a captured image, a color temperature map that indicates color temperature information of light illuminating a captured scene for each area, is disclosed. The apparatus determines, for each area of the captured image, either an interactive light source that has a communication function, a non-interactive light source that does not have a communication function, or both of the interactive light source and the non-interactive light source is a light source that illuminates a corresponding area in the captured scene. The apparatus also generates the color temperature map using a result of determination made by the determining unit, color temperature information acquired from the interactive light source through communication, and color temperature information of the non-interactive light source that is estimated based on the captured image.

24 Claims, 11 Drawing Sheets

(51) Int. Cl.
*G06T 11/00* (2006.01)
*G06T 7/90* (2017.01)
*H04N 9/73* (2006.01)

(52) U.S. Cl.
CPC ........... *H04N 5/2351* (2013.01); *H04N 9/735* (2013.01); *G06T 2207/10024* (2013.01)

(56) References Cited

U.S. PATENT DOCUMENTS

| | | | |
|---|---|---|---|
| 10,003,779 B2* | 6/2018 | Ioka | H04N 1/6027 |
| 2007/0268380 A1* | 11/2007 | Takasumi | H04N 9/735 |
| | | | 348/231.1 |
| 2013/0155274 A1* | 6/2013 | Yoshino | H04N 9/735 |
| | | | 348/E9.051 |
| 2016/0269707 A1* | 9/2016 | Yoshizaki | H04N 9/0451 |
| 2019/0132564 A1* | 5/2019 | Wang | H04N 5/243 |
| 2019/0394440 A1* | 12/2019 | Wang | H04N 9/73 |

FOREIGN PATENT DOCUMENTS

| | | | | |
|---|---|---|---|---|
| JP | 2010177741 A | | 8/2010 | |
| JP | 2013106247 A | * | 5/2013 | |
| JP | 2015192152 A | | 11/2015 | |
| WO | WO-2015079795 A1 | * | 6/2015 | ............. H04N 9/735 |

\* cited by examiner

FIG. 6

2005 — AREA A
COLOR TEMPERATURE: 7000K
Δuv: 0
- LIGHT SOURCE b (XYZ)
  LUMINANCE: 80%
METHOD OF OBTAINING COLOR TEMPERATURE: IDENTIFY COLOR TEMPERATURE

2007 — AREA C
COLOR TEMPERATURE: 3000K
Δuv: 0
- LIGHT SOURCE b (XYZ)
  LUMINANCE: 80%
METHOD OF OBTAINING COLOR TEMPERATURE: DETECT WHITE AREA

2006 — AREA B
COLOR TEMPERATURE: 5000K
Δuv: 0
- LIGHT SOURCE a (XYZ)
  LUMINANCE: 20%
  METHOD OF OBTAINING COLOR TEMPERATURE: IDENTIFY COLOR TEMPERATURE
- LIGHT SOURCE b (XYZ)
  LUMINANCE: 20%
  METHOD OF OBTAINING COLOR TEMPERATURE: DETECT WHITE AREA

2008 — AREA D
COLOR TEMPERATURE: 2800K
Δuv: -10
- LIGHT SOURCE a (XYZ)
  LUMINANCE: 20%
  METHOD OF OBTAINING COLOR TEMPERATURE: IDENTIFY COLOR TEMPERATURE
- LIGHT SOURCE b (XYZ)
  LUMINANCE: 20%
  METHOD OF OBTAINING COLOR TEMPERATURE: DETECT WHITE AREA
- LIGHT SOURCE c (XYZ)
  LUMINANCE: 50%
  METHOD OF OBTAINING COLOR TEMPERATURE: DETECT WHITE AREA

Regions: 2001, 2002, 2003, 2004

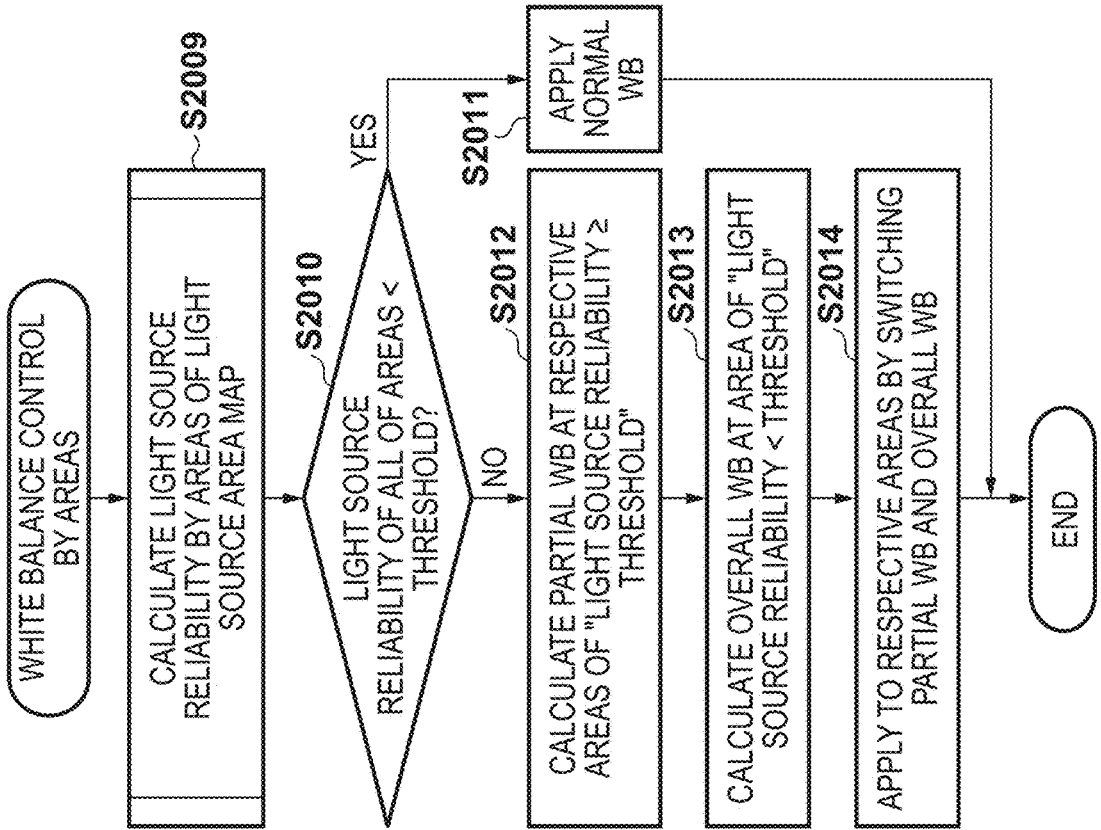
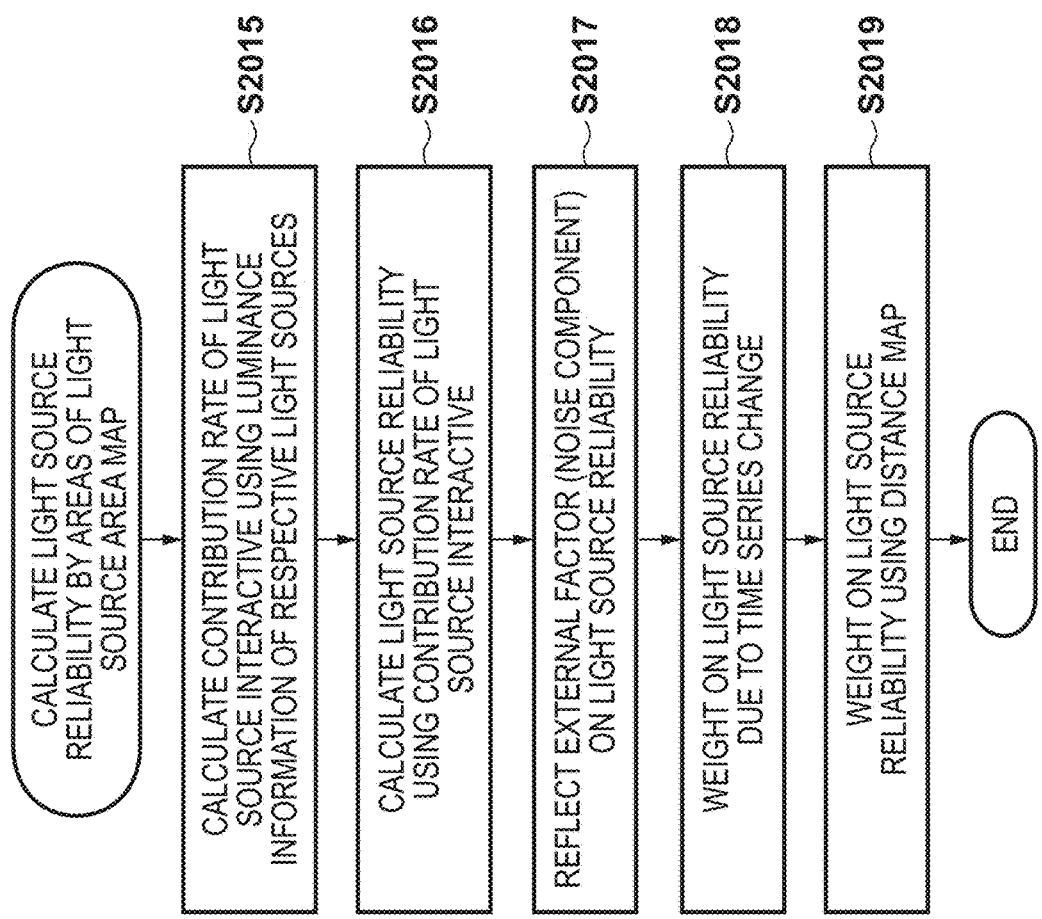

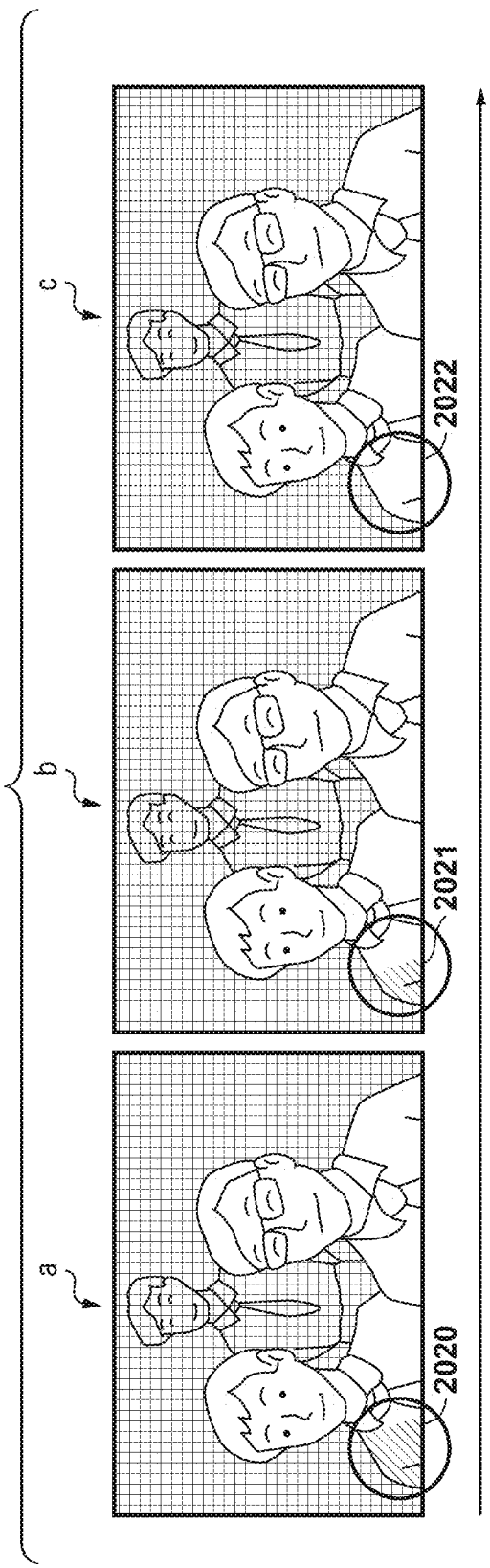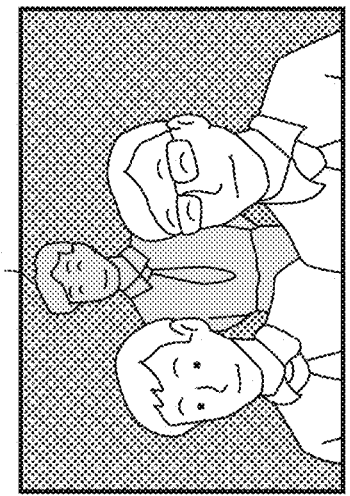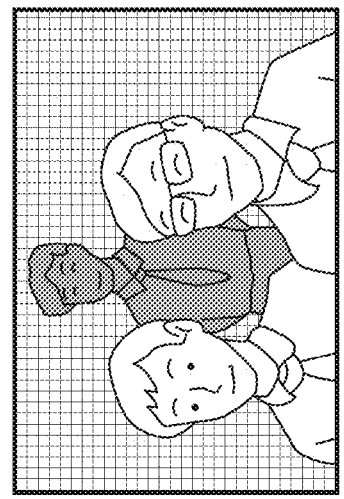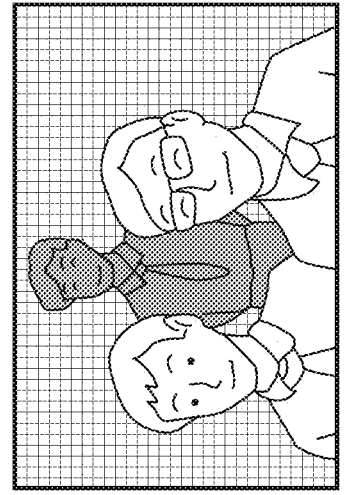

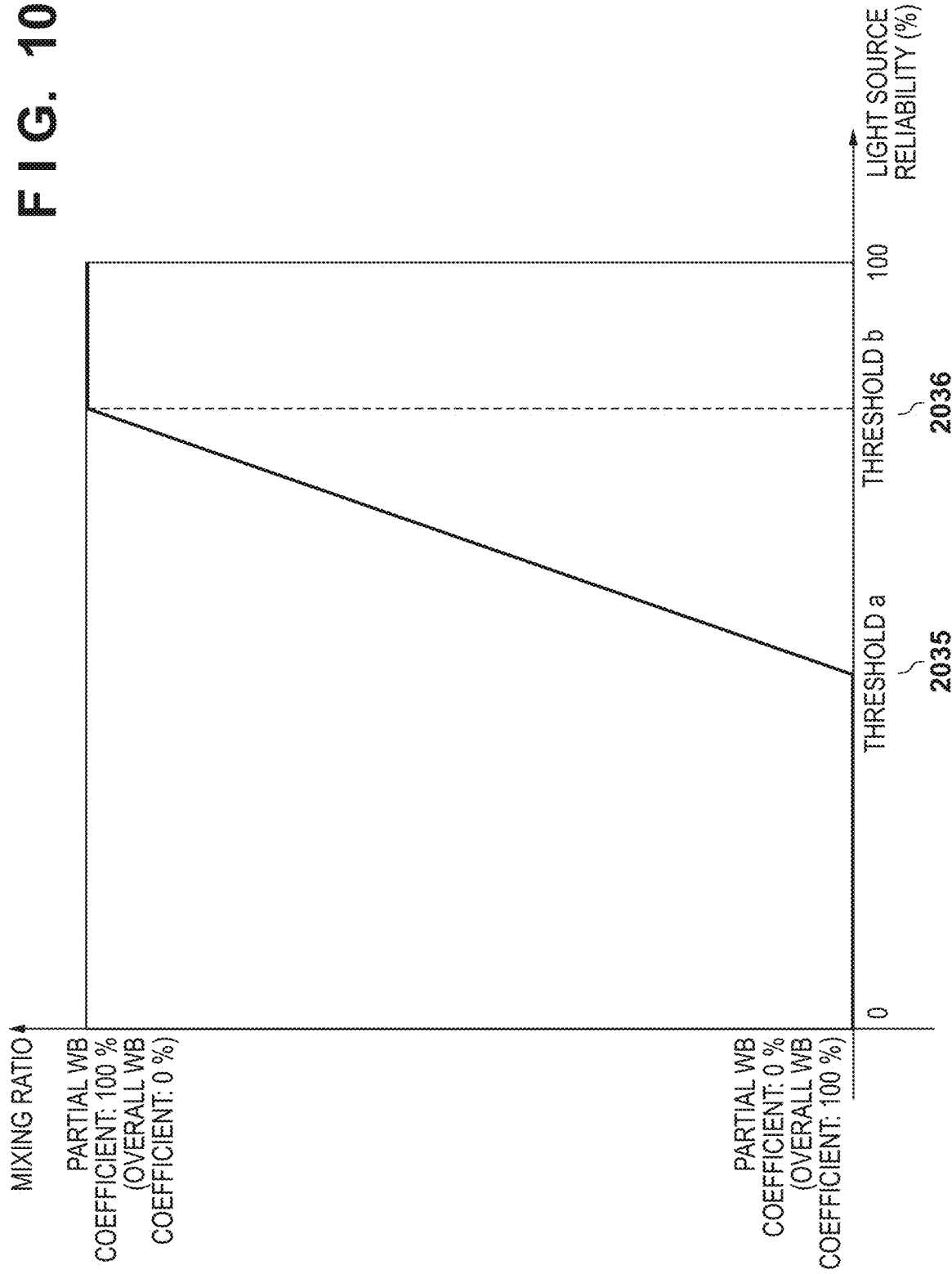

IMAGE PROCESSING APPARATUS, IMAGE CAPTURE APPARATUS, AND IMAGE PROCESSING METHOD

BACKGROUND OF THE INVENTION

Field of the Invention

The present invention relates to image processing apparatus, image capture apparatus, and image processing method, and specifically relates to a technique of acquiring light source information.

Description of the Related Art

Some image capture apparatuses that use an image sensor such as a digital camera and a digital video camera have an automatic white balance control function for automatically adjusting the white balance of an image based on an image (captured image) obtained by capturing. For example, the automatic white balance control function can be realized by detecting a portion considered to be white from a captured image, and applying a gain (called as a white balance coefficient or a correction value) for each color component that is calculated such that the detected portion is to be an achromatic color to the entire image.

Moreover, Japanese Patent Laid-Open No. 2002-271638 discloses a digital camera that can realize appropriate white balance for the entire image of a captured image in a scene in which a plurality of environmental light sources having different color temperatures are present, by applying white balance coefficients that are different for respective areas. Also, Japanese Patent Laid-Open No. 2015-192152 discloses an image capture apparatus that switches between applying the same white balance coefficient to the entire image and applying white balance coefficients that are different for respective areas, based on a captured image.

In the techniques disclosed in Japanese Patent Laid-Open No. 2002-271638 and Japanese Patent Laid-Open No. 2015-192152, the color temperature of an environmental light is estimated based on only the captured image, and therefore there are cases where, if a subject of an achromatic color is not included in the captured scene, the estimation accuracy of the color temperature drops.

The present invention provides, in one aspect, an image processing apparatus and an image processing method with which the color temperature of an environmental light can be accurately estimated using information other than the captured image.

SUMMARY OF THE INVENTION

According to an aspect of the present invention, there is provided an image processing apparatus that generates, from a captured image, a color temperature map that indicates color temperature information of light illuminating a captured scene for each area, comprising: one or more processors that execute a program stored in a memory and thereby function as: a determining unit configured to determine, for each area of the captured image, either an interactive light source that has a communication function, a non-interactive light source that does not have a communication function, or both of the interactive light source and the non-interactive light source is a light source that illuminates a corresponding area in the captured scene: and a generating unit configured to generate the color temperature map using: a result of determination made by the determining unit, color temperature information acquired from the interactive light source through communication, and color temperature information of the non-interactive light source that is estimated based on the captured image.

According to another aspect of the present invention, there is provided an image capture apparatus comprising: an image sensor; and an image processing apparatus that generates, from a captured image obtained by the image sensor, a color temperature map that indicates color temperature information of light illuminating a captured scene for each area, wherein the image processing apparatus comprises: one or more processors that execute a program stored in a memory and thereby function as: a determining unit configured to determine, for each area of the captured image, either an interactive light source that has a communication function, a non-interactive light source that does not have a communication function, or both of the interactive light source and the non-interactive light source is a light source that illuminates a corresponding area in the captured scene: and a generating unit configured to generate the color temperature map using: a result of determination made by the determining unit, color temperature information acquired from the interactive light source through communication, and color temperature information of the non-interactive light source that is estimated based on the captured image.

According to a further aspect of the present invention, there is provided an image processing method for generating, from a captured image, a color temperature map in that indicates color temperature information of light illuminating a captured scene for each area, the image processing method comprising: determining, for each area of the captured image, either an interactive light source that has a communication function, a non-interactive light source that does not have a communication function, or both of the interactive light source and the non-interactive light source is a light source that illuminates a corresponding area in the captured scene: and generating the color temperature map using a result of the determination, color temperature information acquired from the interactive light source through communication, and color temperature information of the non-interactive light source that is estimated based on the captured image.

According to another aspect of the present invention, there is provided a non-transitory computer-readable medium storing a program for causing a computer to execute an image processing method for generating, from a captured image, a color temperature map in that indicates color temperature information of light illuminating a captured scene for each area, the image processing method comprising: determining, for each area of the captured image, either an interactive light source that has a communication function, a non-interactive light source that does not have a communication function, or both of the interactive light source and the non-interactive light source is a light source that illuminates a corresponding area in the captured scene: and generating the color temperature map using a result of the determination, color temperature information acquired from the interactive light source through communication, and color temperature information of the non-interactive light source that is estimated based on the captured image.

Further features of the present invention will become apparent from the following description of exemplary embodiments (with reference to the attached drawings).

BRIEF DESCRIPTION OF THE DRAWINGS

FIG. 6 is a schematic diagram illustrating one example of a color temperature map.

FIGS. 7A and 7B are flowcharts regarding white balance control processing by area in a seventh embodiment.

FIG. 8 is a schematic diagram illustrating an example of a change in color temperature map over time.

FIG. 10 is a diagram illustrating an example of a mixing ratio between a partial WB coefficient and an overall WB coefficient according to the light source reliability.

DESCRIPTION OF THE EMBODIMENTS

Figure 1A:
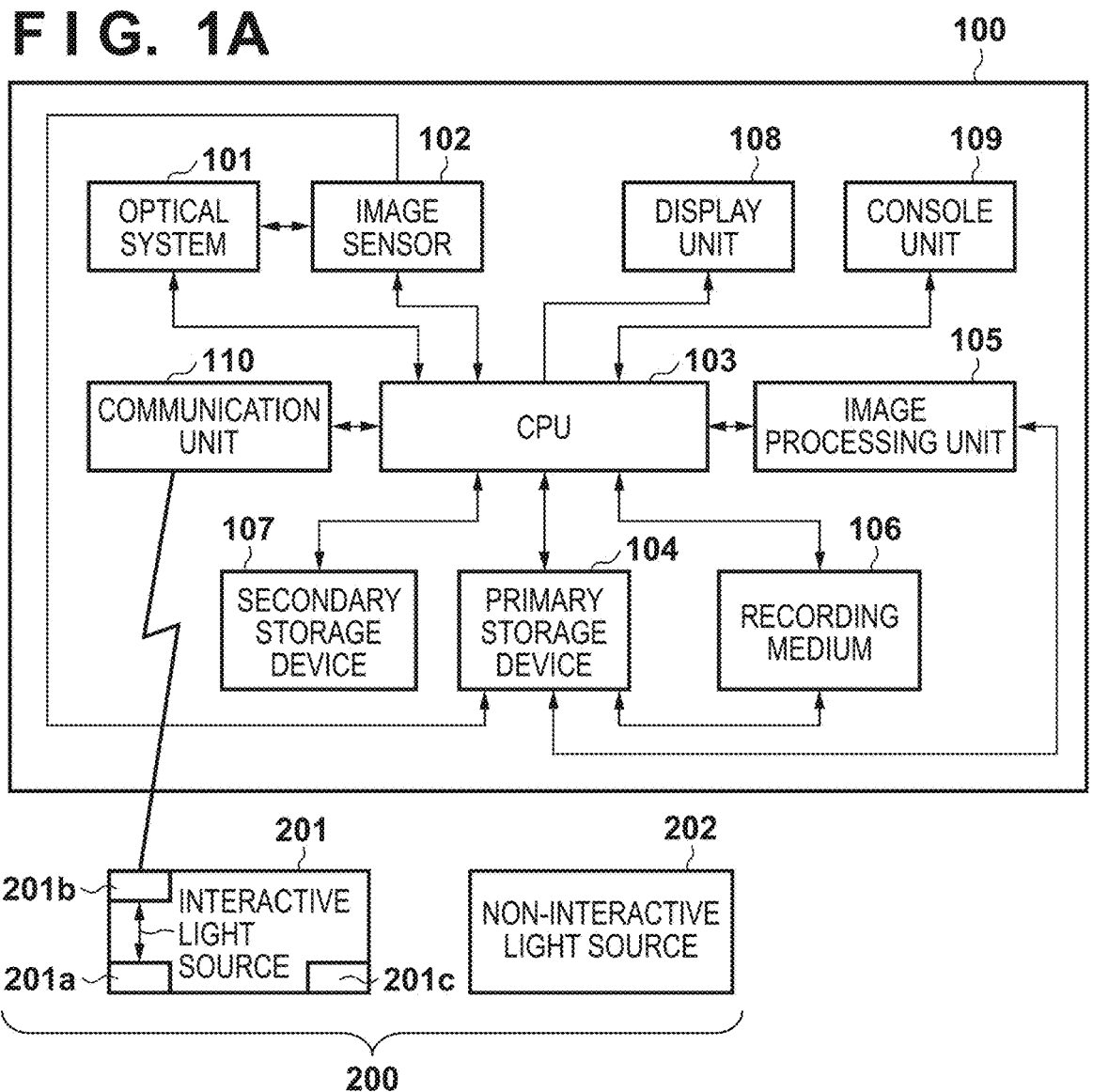
FIG. 1A is a block diagram illustrating an exemplary functional configuration of an image capture apparatus that is one example of an image processing apparatus according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Note that, in the following embodiments, a case where the present invention is implemented in an image capture apparatus such as a digital camera or a digital video camera will be described. However, image capture function is not essential to the invention, and the invention can be implemented in any electronic device that can process image data. Such electronic devices include a video camera, a computer device (such as a personal computer, a tablet computer, a media player, or a PDA), a mobile phone, a smartphone, a game machine, a robot, a drone, and a drive recorder. These are merely examples, and the invention can be implemented in another electronic device.

First Embodiment

FIG. 1A is a block diagram illustrating a basic exemplary functional configuration of an image capture apparatus 100 (hereinafter, referred to as a camera 100), a one example of the image processing apparatus according to the embodiment of the present invention. An optical system 101 is an imaging optical system that includes a lens group, a shutter, an aperture, and the like, and forms an optical image of a subject on an image plane of an image sensor 102. The lens group includes fixed lenses and movable lenses, and the movable lenses include a lens for image stabilization, a focus lens, a variable magnification lens, and the like. Also, the aperture may have a shutter function. The operations of the movable lenses, the aperture, and the shutter are controlled by a CPU 103, which is a main control unit of the camera 100. The optical system 101 may be replaceable or not. Note that when the optical system 101 is replaceable, the shutter is provided on the body side of the camera 100. Note that the camera 100 may not include a mechanical shutter. The CPU 103 can acquire pieces of information (focus lens position, focal length, F-number, and the like) of the optical system 101 directly or indirectly through a controller of the optical system 101.

The image sensor 102 is a CCD image sensor or a CMOS image sensor, for example, and in which a plurality of pixels each including a photoelectric conversion area are two-dimensionally arranged. Also, the image sensor 102 includes a color filter having a specific color pattern, and each pixel is provided with a filter of one color according to the color pattern. The present invention does not depend on the color pattern of the color filter, but here, a color filter having a primary color Bayer array is assumed to be provided. Therefore, each pixel is provided with one of color filters of R (red), G (green), and B (blue). The image sensor 102 converts an optical image into an analog image signal indicating luminance information of each pixel by performing photoelectric conversion in each pixel.

The analog image signal generated by the image sensor 102 is converted to a digital image signal by an A/D converter (not illustrated). Note that the A/D converter may be included in the image sensor 102, or the CPU 103 may perform A/D conversion. The pixel signal that constitutes a digital image signal output from the A/D converter is RAW data including only a luminance component of the color of the color filter provided in the pixel that generates the signal. The CPU 103 stores the RAW data in a primary storage device 104. Note that the imaging sensitivity (hereinafter, referred to as "ISO speed") of the image sensor 102 is set by the CPU 103.

The CPU 103 controls the units of the camera 100 and realizes various functions of the camera 100 by transferring a program stored in a secondary storage device 107 to the primary storage device 104 and executing the program. Note that, in the following description, at least some of the functions realized by the CPU 103 executing a program may be realized by dedicated hardware such as an ASIC.

The primary storage device 104 is a volatile storage device such as a RAM. The primary storage device 104 is used by the CPU 103 to execute a program, and in addition thereto, is used as a buffer memory of image data, a work area for image processing, a video memory for display, or the like.

The secondary storage device 107 is a rewritable nonvolatile storage device such as an EEPROM. The secondary storage device 107 stores a program (command) that can be executed by the CPU 103, settings of the camera 100, GUI data, and the like.

A recording medium 106 is a rewritable nonvolatile storage device such as a semiconductor memory card. The recording medium 106 may be detachable relative to the camera 100 or maybe not. The data (still image data, moving image data, sound data, etc.) generated by the camera 100 can be recorded in the recording medium 106. That is, the camera 100 includes a function of reading/writing from/to the recording medium 106 and a detachment mechanism (if the recording medium 106 is detachable). Note that the recording destination of data generated by the camera 100 is not limited to the recording medium 106. The data may be transmitted to an external device thorough a communication interface included in the camera 100, and the external device may record the data in a recording apparatus that can be accessed by the external device.

A display unit 108 is a liquid crystal display, for example. The CPU 103 functions as a display control device of the display unit 108. In a shooting stand-by state and while a moving image is recorded, a shot moving image is displayed in the display unit 108 in real time, and the display unit 108 functions as an electronic viewfinder. Also, image data recorded in the recording medium 106 and a GUI (Graphical User Interface) image such as a menu screen are also displayed in the display unit 108.

A console unit 109 is a generic name of an input device group for accepting a user operation. A button, a lever, a touch panel, and the like are used in the console unit 109. The console unit 109 may include an input device that does not require physical operation, such as those that uses a voice or a line of sight. The input devices included in the console unit 109 are respectively given names corresponding to the assigned functions. A representative example includes a shutter button, a menu button, a direction key, a determination (set) button, a mode switching dial, and the like. Note that different functions may be selectively assigned to one input device.

An image processing unit 105 applies predetermined image processing to image data (that may be RAW data or image data subjected to developing processing), and generates pieces of image data in different formats, and acquires and/or generates various types of information. The image processing unit 105 may be a dedicated hardware circuit such as an ASIC that is designed to realize a specific function, or may be configured such that a specific function is realized by a programmable processor such as a DSP executing software.

Here, the image processing applied by the image processing unit 105 includes preprocessing, color interpolation processing, correction processing, data processing, evaluation value calculation processing, special effect processing, and the like. The preprocessing includes signal amplification, reference level adjustment, defective pixel correction, and the like. The color interpolation processing is processing for obtaining a color component value that is not included in image data read out from pixels by interpolation, and is also called as demosaicing processing or synchronization processing. The correction processing includes white balance control, tone correction (gamma processing), processing for correcting influences of optical aberration and optical vignetting of the optical system 101, and the like. The data processing includes synthesizing processing, scaling processing, encoding and decoding processing, header information generation processing, and the like. The evaluation value calculation processing includes generation processing of a signal and an evaluation value that are to be used for automatic focus detection (AF), calculation processing of an evaluation value to be used for automatic exposure control (AE), and the like. Special effect processing includes addition of blur, changing of color tone, relighting processing, and the like. Note that these are examples of image processing that can be applied by the image processing unit 105, and the image processing to be applied by the image processing unit 105 is not limited thereto.

Among the pieces of image processing applied by the image processing unit 105 to RAW data, a series of image processing for converting RAW data to image data in a general format that can be used for display or printing as photograph data is called as developing processing. In general, the developing processing includes white balance control processing and color complementing processing, and may also include, in addition thereto, lens aberration correction processing, noise reduction (NR) processing, gamma (tone conversion) processing, or the like.

Also, in the image processing unit 105, a series of image processing sets corresponding to shooting modes that can be set to the camera 100 are registered in advance. With this, image processing appropriate for the scene can be executed on image data obtained by shooting a specific scene such as a night scene or a sunset glow.

Note that, in the present embodiment, the image processing unit 105 executes processing regarding the white balance control, but at least some of the processing regarding the white balance control may be executed by the CPU 103.

Figure 1B:
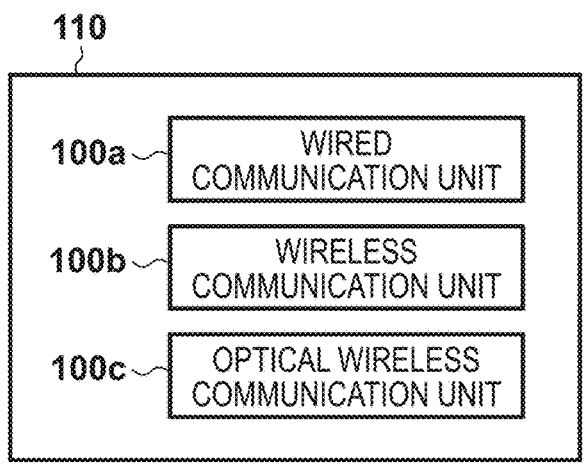
FIG. 1B illustrates an exemplary configuration of a communication unit 110.

A communication unit 110 is a communication interface with an external apparatus such as an interactive light source 201. The communication unit 110 can perform communication conforming to at least one standard of wired and wireless communication. For example, the communication unit 110 may include separate communication units according to the type and standard of communication, as shown in FIG. 1B. FIG. 1B shows an example in which the communication unit 100 includes a wired communication unit 100*a*, a wireless communication unit 100*b*, and an optical wireless communication unit 100*c*. Here, the wireless communication unit 100*b* performs communication conforming to a communication standard using an electromagnetic wave such as Wi-Fi (at least one of IEEE 802.11 series) or Bluetooth (registered trademark). The optical wireless communication unit 100*c* performs communication conforming to a communication standard using light such as IrDA or Li-Fi. The wired communication unit 100*a* performs communication conforming to a communication standard using a wired transmission line such as Ethernet (registered trademark) or USB. Each communication unit may conform to a plurality of communication standards.

The wired communication unit 100*a*, the wireless communication unit 100*b*, and the optical wireless communication unit 100*c* may be mounted in the camera 100 using any method as long as communication with an external apparatus can be realized. In particular, the optical wireless communication unit 100*c* can be mounted so as to replace some pixels of the image sensor 102. The optical wireless communication unit 100*c* that is arranged on the image sensor 102 is called as optical communication sensors 110*d*.

Figure 1C:
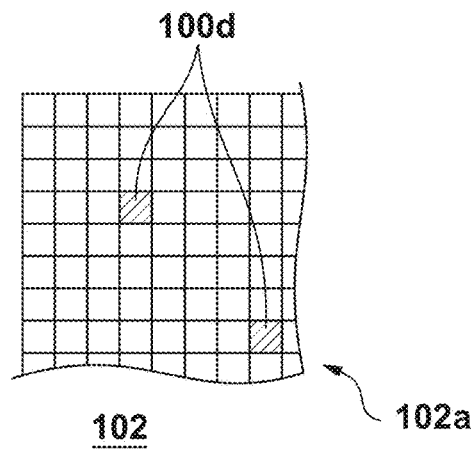
FIG. 1C is a diagram schematically illustrating an exemplary arrangement of optical communication sensors 100d in an image sensor.

The optical communication sensors 100*d* are regularly arranged in the pixel array 102 in which a plurality of pixels are two-dimensionally arranged, as shown in FIG. 1C. As a result of arranging the plurality of optical communication sensors 100*d* in a form of replacing some pixels, in this way, pieces of information that are different for respective partial areas centered about respective optical communication sensors 100*d* can be received by the optical communication sensors 100*d*. For example, when ten optical communication sensors 100*d* are arranged in the pixel array 102*a* at equal intervals, a captured image can be divided into ten partial areas each including one optical communication sensor 100*d*. If a light source that transmits information of the light source using emitted light is present, information regarding a light source that illuminates a captured scene can be obtained, for each partial area, from the information of the light source that is received by the optical communication sensor 100d as reflected light. The optical communication sensor 100d may be a pixel including a filter having a spectral characteristic of selectively transmitting light having a wavelength that the light source uses for communication, similarly to the color filter, for example. Note that when shot image data is generated, the optical communication sensors 100d are treated as defective pixels.

A light source group 200 is a plurality of light sources that illuminate a captured scene. In the present embodiment, the light source group 200 includes an interactive light source 201 and a non-interactive light source 202. The interactive light source 201 includes a control unit 201a, a communication unit 201b, and a light emitting unit 201c, and is a light source that can communicate with the camera 100 through the communication unit 110. The light emitting unit 201c includes a plurality of LEDs of R (red), G (green), and B (blue), for example. The interactive light source 201 is an intelligent light source (smart light source), and the color temperature and brightness of the light source can be changed by the control unit 201a controlling the light emitting intensities of LEDs of the light emitting unit 201c for respective color components. The control unit 201a changes the brightness (including turning/on and off) and the color temperature of the light emitting unit 201c in accordance with the instruction from the camera 100. Also, the control unit 201c can transmit, when communication with the camera 100 is established or in response to the request from the camera 100, the information of the interactive light source 201 (brightness, color temperature, adjustable parameter and its range, and whether or not optical communication function is present, hereinafter these pieces of information are referred to as light source information) to the camera 100.

The non-interactive light source 202 is a light source (conventional light source) that does not have a communication function with an external apparatus. The non-interactive light source 202 includes, in addition to an artificial light source, a natural light source such as sunlight. The non-interactive light source is a light source such as a conventional fluorescent light regarding which controlling of the light emitting state or acquisition of information thereof cannot be performed from the camera 100.

Creation of Color Temperature Map

Figure 2:
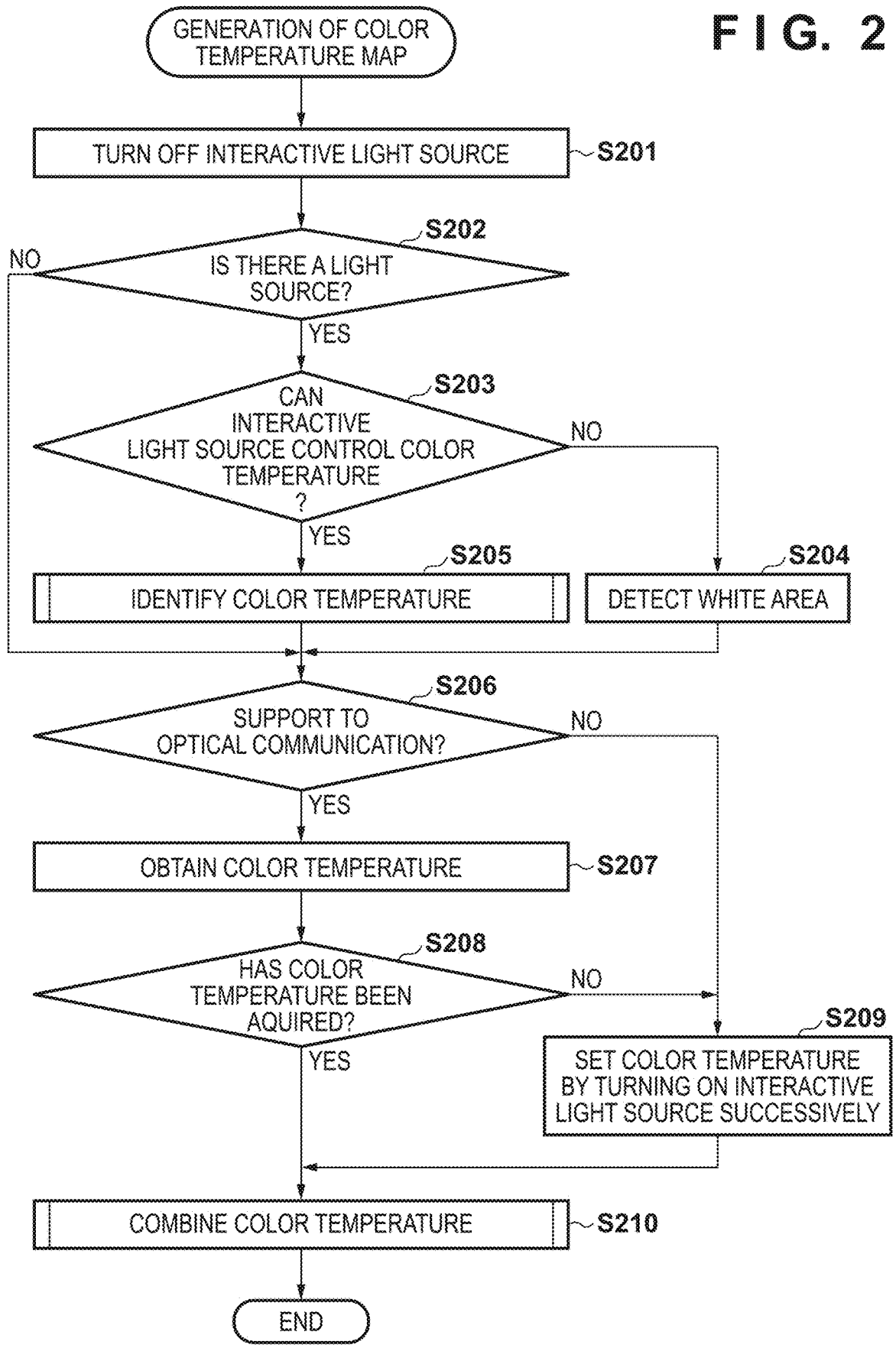
FIG. 2 is a flowchart regarding color temperature map generation processing according to the embodiment

FIG. 2 is a flowchart regarding operations of generating a color temperature map that are realized by the CPU 103 controlling the units, in the present embodiment. The color temperature map is information in which, for each partial area of the captured image, color temperature information regarding illumination light at a corresponding captured scene is recorded.

Note that the range of the captured scene indicated by the color temperature map need not be completely matched with the captured scene of the captured image. For example, the color temperature map may be created with respect to a range including the captured scene, or a part of the captured scene (e.g., a part of edge portions of the captured scene) may not be included in the color temperature map.

The color temperature information may be a color temperature representing the color of light emitted by the light source using a corresponding blackbody temperature (unit: kelvin (K)). With respect to a light source whose chromaticity is not present on the blackbody locus, the correlated color temperature information may be adopted, and in this case, the color temperature information is information also including a color difference $\Delta uv$ from the blackbody locus. Also, a chromaticity coordinate value (x, y) in the XYZ color system may be adopted. Also, any form of the color temperature information may be adopted as long as the information is information representing the light source or the color of light emitted by the light source, such as the information obtained by the spectrum of spectral distribution being sampled and recorded. In the following "color temperature" is used as a generic name of information in which a light source or the color of light emitted by the light source is represented using any scale.

Note that, if the color temperature of the light source changes due to degradation over time of the light emitting body or the like of the interactive light source 201, the difference between the color temperature in the specification that is transmitted by the interactive light source 201 and the actual color temperature increases. Therefore, information regarding a use period or a use status of the light source may be added to the color temperature map. Also, when it can be determined that the difference between the color temperature in the specification and the actual color temperature is largely based on the use period and the use status of the light source, for example, intrinsic information of the interactive light source 201 may be included in the color temperature map instead of the color temperature. In this case, the color temperature cannot be known from the color temperature map, but it is possible to understand partial areas whose color temperatures are different. Also, luminance information may be added to the color temperature map.

The generation operation of the color temperature map shown in FIG. 2 may be executed in response to a user instruction made through the console unit 109, or may be automatically executed as a part of the white balance control operation. Note that, before starting the generation operation of the color temperature map, the CPU 103 detects interactive light sources that are present in a communication range of the communication unit 110, and enters a state of being able to communicate with each of the detected interactive light sources. Note that, here, it is assumed that the command system for controlling the interactive light source is common with respect to all of the interactive light sources, for the sake of description and understanding. Also, the optical communication sensors 100d are assumed to be provided in the image sensor 102.

In step S201, the CPU 103 transmits a command instructing to turn off light to an interactive light source 201 through the communication unit 110. This command is a command to be issued to interactive light sources 201 without imposing limitation or a command to be separately issued to a designated interactive light source 201, with respect to the interactive light sources 201 that are detected in advance, for example. With this, the interactive light sources 201 that are present in the communication range are turned off. On the other hand, the state of the non-interactive light source 202 remains the same.

In step S202, the CPU 103 obtains a captured image by executing shooting. Alternatively, when moving image shooting is performed in parallel, a frame image that is shot after transmitting the turning off instruction may be used. The CPU 103 acquires the luminance information of the captured image using the image processing unit 105, and determines whether or not an illuminated area is present.

For example, if it is determined that an area whose luminance is a threshold value or more based on an average luminance of the entire captured image or an average luminance of each of partial areas obtained by dividing the captured image, it can be understood that a portion illuminated by the non-interactive light source 202 is present in the captured scene. If it is determined that an illuminated area is present in the captured scene, the CPU 103 executes step S203. If it is not determined that an illuminated area is present in the captured scene, the CPU 103 executes step S206.

As described above, the CPU 103 can obtain the color temperature of an interactive light source 201 by communicating with the interactive light source 201. However, regarding the non-interactive light source 202, the color temperature needs to be estimated from a captured image. The processing in steps S203 to S205 is processing for estimating the color temperature of the non-interactive light source 202.

In step S203, the CPU 103 determines whether or not the interactive light source 201 has a function of controlling the color temperature. If it is determined that the light source 201 has a function of controlling the color temperature, the CPU 103 executes step S205, whereas if it is not determined that the light source 201 has a function of controlling the color temperature, the CPU 103 executes step S204. This determination can be performed based on the light source information acquired when establishing communication with the interactive light source 201, or based on the light source information acquired from the interactive light source 201 in step S203.

In step S204, the CPU 103 estimates the color temperature of the non-interactive light source 202 using a known automatic white balance control method. For example, the CPU 103 estimates the color temperature using a value of a pixel that is determined to be white out of the captured image.

For example, the image processing unit 105 divides the captured image into a predetermined number (e.g., 24 in a horizontal direction and 16 in a vertical direction) of images, and calculates color evaluation values based on RGB signals included in the respective divided areas. Also, the image processing unit 105 detects an area whose color evaluation value is included in evaluation values of a white range determined in advance as a white area. Note that it is assumed that "white area" is not limited to white and includes an area of an achromatic color. Also, the interactive light source 201 is turned off in a stage of step S204, and therefore the white area is detected from divided areas whose average luminance is a threshold value or more, out of the divided areas.

The CPU 103 estimates a light source having a color evaluation value whose distance, in the chromaticity diagram, from the color evaluation value obtained by the image processing unit 105 is shortest, out of the color evaluation values similarly obtained from captured images obtained by shooting a white object under a plurality of different types of light sources, in advance. Also, the CPU 103 estimates the color temperature of the specified light source as the color temperature of the non-interactive light source 202 that illuminates the divided area corresponding to the color evaluation value obtained by the image processing unit 105.

In this way, the color temperature of the non-interactive light source 202 that illuminates the divided area can be estimated. Note that the color temperature to be estimated here is a color temperature obtained by assuming that the non-interactive light source 202 that illuminates the divided area is one light source. When a plurality of non-interactive light sources 202 having different color temperatures illuminate one divided area, the color temperatures of individual non-interactive light sources 202 cannot be estimated with this method.

Note that a divided area that does not include an achromatic color portion is not detected as a white area, and therefore it is difficult to estimate the color temperature of a light source with respect to the divided area. With respect to such a divided area, the CPU 103 may record a predetermined color temperature, or may record an error value indicating that the color temperature cannot be detected.

Figure 3A:
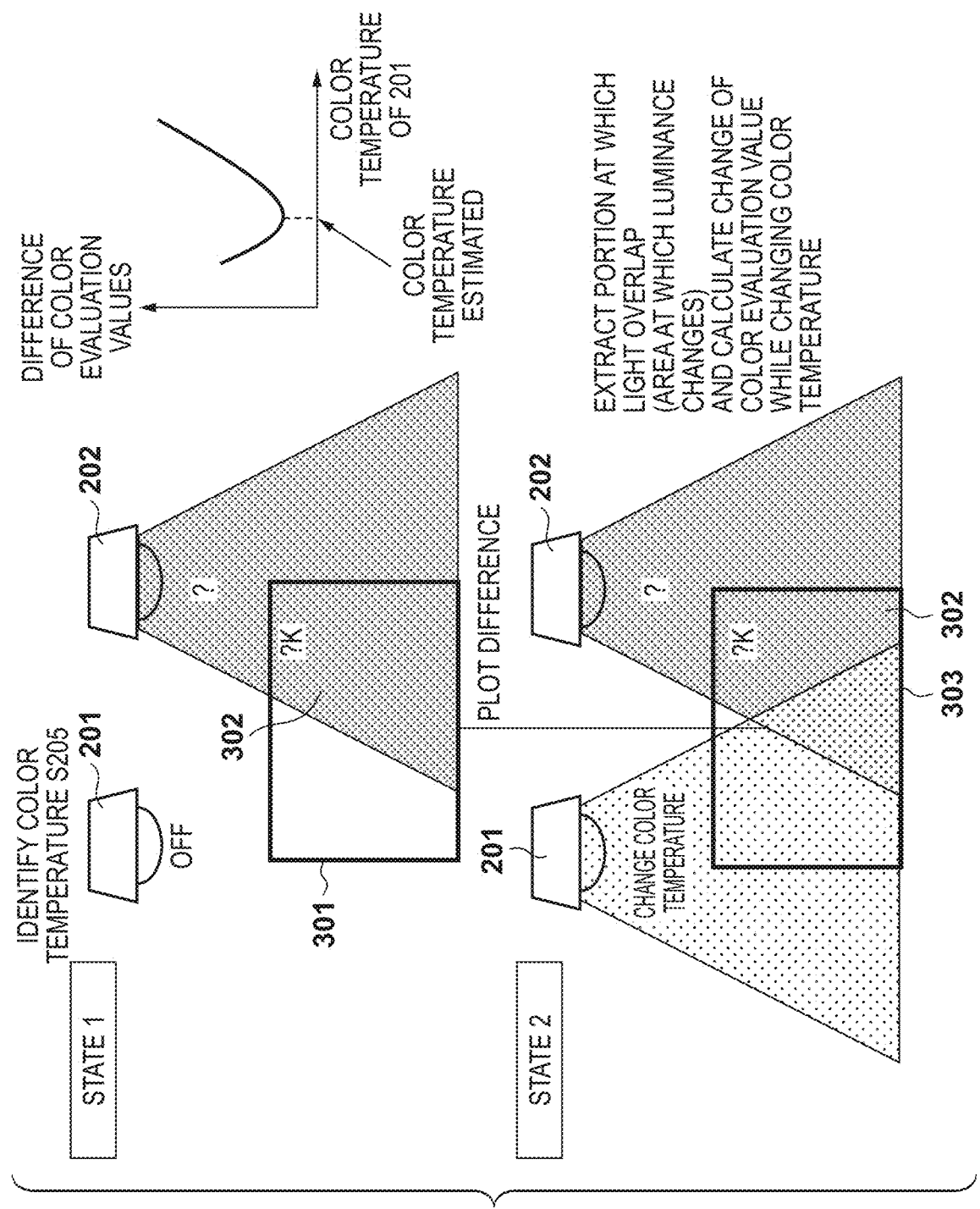
FIG. 3A is a diagram regarding the color temperature identifying processing in FIG. 2.
Figure 3B:
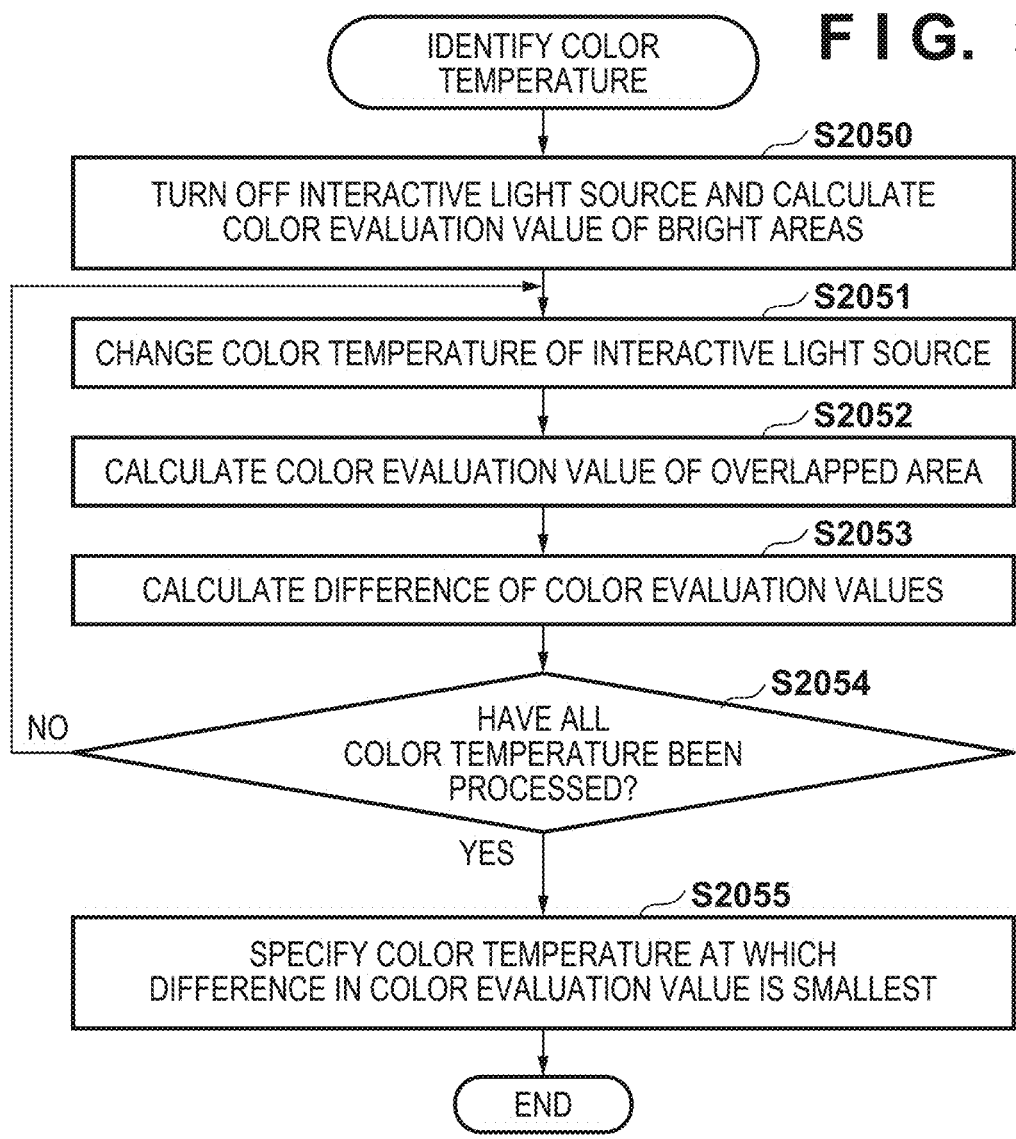
FIG. 3B is a flowchart regarding the color temperature identifying processing in FIG. 2.

The processing in step S205 corresponds to color temperature identifying processing for estimating the color temperature of the non-interactive light source 202 using the interactive light source 201 whose color temperature can be controlled from the camera 100. FIG. 3A is a diagram schematically illustrating the color temperature identifying processing in step S205, and FIG. 3B is a flowchart of the color temperature identifying processing. 301 indicates a captured scene (shooting range). Therefore, the shooting range 301 shown in FIG. 3A includes an area illuminated by the interactive light source 201, an area illuminated by the non-interactive light source 202, and an area illuminated by both of the light sources.

Because the interactive light source 201 is turned off when the execution of step S205 is started, the state corresponds to state 1.

First, in step S2050, the CPU 103 calculates the color evaluation value with respect to a divided area whose average luminance is the threshold value or more, similarly to step S204, using the image processing unit 105, with respect to a captured image obtained in this state.

Next, in step S2051, the CPU 103 turns on the interactive light source 201 so as to enter state 2. Also, the CPU 103 causes the interactive light source 201 emits light at a predetermined color temperature. The CPU 103 changes the color temperature of the interactive light source 201 when executing step S2051 second time or later. The CPU 103 detects an area 303 (overlapped area) whose luminance has increased as a result of turning on the interactive light source 201, out of the area illuminated by the non-interactive light source 202 (partial area 302 of the shooting range 301) in the captured image obtained at state 1, from the captured image, using the image processing unit 105. Also, the CPU 103 causes the image processing unit 105 to calculate the color evaluation value of the detected overlapped area.

In step S2053, the image processing unit 105 compares the color evaluation value calculated with respect to the overlapped area with the color evaluation value obtained with respect to the same area of the captured image at state 1, and outputs the difference to CPU 103.

In step S2054, the CPU 103 determines whether or not the difference in color evaluation value has been calculated at states in which the interactive light source 201 is caused to emit light at a plurality of respective predetermined color temperatures. If it is determined that a color temperature with respect to which the difference in color evaluation value has not been obtained is present, the CPU 103 again executes step S2051. If it is determined that the difference in color evaluation value has been calculated at all of the plurality of color temperatures, executes step S2055. In this way, in steps S2051 to S2054, the CPU 103 obtains the value of the difference in color evaluation value that is obtained by the image processing unit 105, while changing the color temperature of the interactive light source 201 step by step.

In step S2055, the CPU 103 specifies a color temperature of the interactive light source at which the difference in color evaluation value is smallest, and regards this color temperature as the color temperature of the non-interactive light source 202. The reason is because when the color temperature of the interactive light source 201 becomes the same as the color temperature of the non-interactive light source 202, the color evaluation values obtained at state 1 and state 2 become the same with respect to the partial area 303. Note that, as a result of detecting the overlapped area when the color evaluation value is obtained at state 1, and obtaining the color evaluation value with respect to the overlapped area at state 1 as well, the color evaluation value can be obtained with respect to the same area (overlapped area) at state 1 and state 2, and the estimation accuracy can be improved. However, at state 2, the color evaluation value need only be obtained with respect to at least an area illuminated by the interactive light source 201. Note that, if the areas with respect to which color evaluation value is obtained are different between state 1 and state 2, there are cases where the subjects included in the areas are different, and in this case, it is possible that the estimation accuracy drops.

Note that if the color temperature of the interactive light source 201 at which the difference in color evaluation value is smallest cannot be detected, the CPU 103 can set, as the color temperature of the non-interactive light source 202, the color temperature that is smallest in a variable range of the color temperature of the interactive light source 201, or can set a value indicating an error. For example, a case where the color temperature of the non-interactive light source 202 is not included in the variable range of the color temperature of the interactive light source 201 corresponds to this case. For example, when the color temperature of the interactive light source 201 is variable in a range from 3000K to 7000K, and the color temperature of the non-interactive light source 202 is 8000K, the minimum point of the difference in color evaluation value cannot be specified. In this case, the CPU 103 can set the color temperature of 7000K can be set as the color temperature of the non-interactive light source 202, or can set an error value.

Also, in state 2, if the area 303 that is illuminated by both of the interactive light source 201 and the non-interactive light source 202 is too bright or too dark, the RGB signal may saturate or take a value close to 0, and therefore it becomes difficult to correctly calculate the color evaluation value of the area 303. In this cased as well, the CPU 103 can set an error value as the color temperature of the non-interactive light source 202.

The color temperature identifying processing in step S205 has a merit, different from the white range detection in step S204, of being able to estimate the color temperature of the non-interactive light source 202 even when a subject of an achromatic color is not present in the captured scene. However, the color evaluation value is influenced by the original color of an object, and therefore, if the subject has a strong chromatic color, the estimation accuracy of the color temperature drops. Therefore, the color evaluation values at state 1 and state 2 may be calculated by excluding a divided area having a strong chromatic color, out of the divided areas included in the area 303.

The area 303, of the shooting range 301, that is illuminated by both of the interactive light source 201 and the non-interactive light source 202 can be detected as an area that becomes brighter at state 2, out of the areas whose luminance is the threshold value or more at state 1. If the area 303 is not present, divided areas whose distance is small, out of the areas whose luminance is the threshold value or more at state 1 and areas that become brighter at state 2 than at state 1, are taken as a pseudo overlapped area.

Note that because the partial areas that are taken as the pseudo overlapped area are separate, the possibility that subjects of different colors are shot in the respective partial areas increases, and the estimation accuracy of the color temperature drops. Therefore, the differences of color evaluation values obtained by using a method similar to that in step S204 may be calculated with respect to each of the areas whose luminance is the threshold value or more at state 1 and the areas whose luminance is the threshold value or more at state 2.

Note that, in step S205, the color temperature of the interactive light source 201 may be changed in any way as along as a local minimum value or a minimum value of the color temperature difference can be detected. Several conceivable examples are shown as follows.

(Example 1) The color temperature is switched in an adjustable range in the ascending order or the descending order. For example, the color temperature is switched from 3000K to 3500K, 4200K, 5000K, and 6500K.

(Example 2) In Example 1, since the light of the interactive light source 201 gradually changes from red to blue, a user who looks at the captured scene easily perceive that the illumination color changes. For example, as a result of alternatingly switching the color temperature between a low color temperature and a high color temperature such as the switching from 3000K to 6500K, 3500K, 5000K, and 4200K, because switching between red light and blue light occurs in a short period of time, the red and blue light is not easily perceivable to human eyes.

(Example 3) In Examples 1 and 2, the color temperature is changed in the entirety of adjustable range. However, the changeable range of the color temperature may be limited to a portion of the adjustable range. For example, step S204 is executed prior to step S205, and the color temperature of the non-interactive light source 202 is provisionally estimated. Then, in step S205, the color temperature is changed in a partial range including the estimated color temperature. For example, if the provisionally estimated color temperature is 4200K, the color temperature can be changed in a range from 3500K to 5000K.

(Example 4) The order of color temperatures to be changed is determined using a known method of solving an optimization problem such as a gradient method.

Note that these Examples 1 to 4 may be combined, or the color temperature may be changed with a different method.

When the color temperature of the non-interactive light source 202 is detected in step S204 or S205, the CPU 103 generates a color temperature map be executing step S206 and onward.

In step S206, the CPU 103 determines whether or not the interactive light source 201 has an optical communication function. If it is determined that the optical communication function is included, the CPU 103 executes step S207, whereas if it is not determined that the optical communication function is included, the CPU 103 executes step S209. This determination can be performed based on the light source information acquired when establishing communication with the interactive light source 201, or based on the light source information acquired from the interactive light source 201 in step S203.

In step S207, the CPU 103 receives a signal output from an optical communication sensor 110d through the image processing unit 105, applies necessary processing such as demodulation and decoding, and obtains the color temperature transmitted by the interactive light source 201 using optical communication, for each area of the captured image.

In step S208, the CPU 103 determines whether or not the color temperature has been acquired from each of the optical communication sensors 100d. Because the optical communication with the interactive light source 201 uses light reflected from subjects, if a subject whose reflectance of illumination light of the interactive light source 201 is low is present, the communication quality drops. For example, a black subject and a subject of material that scatters or absorbs light have low light reflectance. Note that an optical communication sensor 100*d* that receives light from an area illuminated by a plurality of light sources receives data from each of the plurality of light sources.

When the communication quality is low and data cannot be correctly obtained, or the interactive light source 201 does not have an optical communication function, in step S209, the CPU 103 determines areas illuminated by the respective interactive light sources 201 in the captured scene. Specifically, the CPU 103 turns off all of the interactive light sources 201, similarly to step S201 (corresponding to state 1 in FIG. 3A).

The area having a luminance of a threshold value or more in the captured image obtained in this state corresponds to an area illuminated by the non-interactive light source 202. The CPU 103 sets the color temperature of the non-interactive light source 202 that is estimated in step S204 or S205, with respect to areas having a luminance of the threshold value or more in the captured image obtained in a state in which all of the interactive light sources 201 are turned off, out of the captured image. The setting of the color temperature may be performed for each divided area described above or may be performed for each pixel.

Next, the CPU 103 obtains a captured image while turning on the interactive light sources 201 one by one. As described regarding state 2 in FIG. 3A, if an area is present that becomes brighter in the captured image as a result of turning on an interactive light source 201 that has been turned off, the area can be determined as an area illuminated by the interactive light source 201 that is turned on. The CPU 103 sets the color temperature of the interactive light source 201 that is turned on with respect to the area that has been determined to be illuminated by the interactive light source 201 that is turned on, out of the captured image.

The CPU 103 can set the color temperature of the interactive light source 201 that is turned on to the color temperature map using light source information acquired when establishing communication with the interactive light source 201 or light source information acquired from the interactive light source 201 in step S203. Alternatively, the CPU 103 may set the color temperature to the color temperature map by again acquiring the light source information from the interactive light source 201 that is turned on, in step S209.

The CPU 103 successively executes similar processing with respect to the remaining interactive light sources 201, and set, with respect to the area illuminated by each interactive light source 201, the color temperature of the interactive light source. When the setting of the color temperature is ended with respect to all of the interactive light sources 201, one or a plurality of color temperatures are set for each area of the captured image.

In step S210, the CPU 103 generates an ultimate color temperature map. If a plurality of light sources are present, an area (hereinafter, referred to as an "overlapped area") that is illuminated by a plurality of light sources may be present, as an area 303 in FIG. 3A. With respect to an area illuminated by an individual light source, the color temperature of the light source is set in step S209, and therefore a plurality of color temperatures are set with respect to an area illuminated by a plurality of light sources.

In step S210, one color temperature is set by combining the color temperatures with respect to an overlapped area with respect to which a plurality of color temperatures are set in this way. The color temperature can be combined using a known method, and one example will be described in the following.

In general, when the reflectance of a subject does not largely rely on the color temperature of a light illuminating the subject, there is a tendency that the color temperature of an overlapped area approaches the color temperature of the light source whose illumination intensity is larger. For example, in an overlapped area illuminated by two light sources of 4000K and 5000K, if the illumination intensity by the light source of 5000K is higher, the color temperature of the overlapped area takes a value that is larger than 4500K (less than 5000K, however).

The illumination intensity depends on the distance from the light source, but the distance from the light source to the subject is unknown, and therefore weighted averaging of the color temperatures is performed according to the brightness (luminance) of the subject due to each light source.

When two light sources are present, the color temperatures thereof are denoted by K1 and K2, and the luminance thereof are denoted by Y1 and Y2, the combined color temperature Kmix can be obtained using the following Formula 1.

$$K\text{mix}=(K1 \times Y1+K2 \times Y2)/(Y1+Y2) \quad \text{(Formula 1)}$$

When three or more light sources are present, the combined color temperature can be calculated by increasing the number of terms. Note that the unit of the color temperature is not limited to K (Kelvin) as described above. When the temperature in K and a color difference Δuv are set to the map in a combined manner, these values may be applied to Formula 1. Also, Formula 1 may be applied in a uniform perceptual space represented using a unit such as the mired ([M]).

Note that the luminance may be calculated from a captured image, or may be calculated using some method based on the brightness (output wattage or total luminous flux) included in the light source information.

Note that there are cases where it is better to not combine the color temperatures with respect to an overlapped area depending on the application of the color temperature map. In this case, the luminance may be calculated as the ratio in brightness between light sources, and included in the color temperature map. Also, a configuration may be adopted in which whether or not step S210 is to be executed can be set. Note that the generation processing of the color temperature map described above can be executed in an apparatus that does not have a function of controlling an interactive light source or an image capture function as long as necessary image data can be obtained. Therefore, the color temperature map can be generated in any apparatus that can acquire an image to be used for estimating the color temperature from the camera 100 or another apparatus.

The color temperature map by area of the captured scene can be generated in this way. The color temperature map can be used in various applications, and as a result of using it in white balance control, for example, accurate white balance control can be realized with respect to a captured image in a scene in which a plurality of light sources whose color temperatures are different are present. In the present embodiment, with respect to an interactive light source (so-called smart illumination), as a result of using information regarding the color temperature that can be acquired from the light source, an accurate color temperature can be obtained without being influenced by the color of a subject. Also, as a result of being able to obtain an accurate color temperature with respect to the interactive light source, the accuracy of estimating the color temperature of a former light source that does not have a communication function can also be improved.

Note that the generation of the color temperature map may be constantly executed, but may be executed only when a specific condition is satisfied. For example, the generation of the color temperature map may be executed at a timing immediately before performing shooting for recording (e.g., timing at which the shooting preparation instruction is detected), or at a timing at which the fact that the captured scene has changed is detected.

Also, when a portion of the shooting range regarding which the color temperature map has already been generated is to be shot, the color temperature map may be generated by cutting out a map in a range corresponding to the captured scene from the color temperature map that has already been generated. For example, when the optical system 101 is a zoom lens, as a result of generating the color temperature map with respect to the shooting range at the wide-angle end, a new color temperature map need not be newly generated when the angle of view is changed or the shooting range is slightly moved.

Second Embodiment

Next, a second embodiment will be described. The present embodiment relates to white balance control (calculation of white balance coefficient) using the color temperature map generated in the first embodiment.

Figure 4:
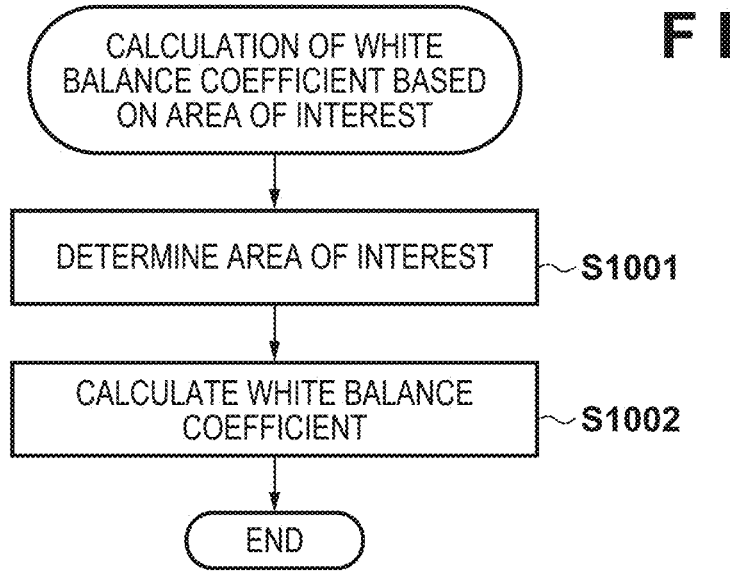
FIG. 4 is a flowchart regarding calculation processing of a white balance coefficient using a color temperature map.

FIG. 4 is a flowchart regarding calculation processing of the white balance coefficient based on an area of interest.

In step S1001, the CPU 103 determines the area of interest.

Figure 5A:
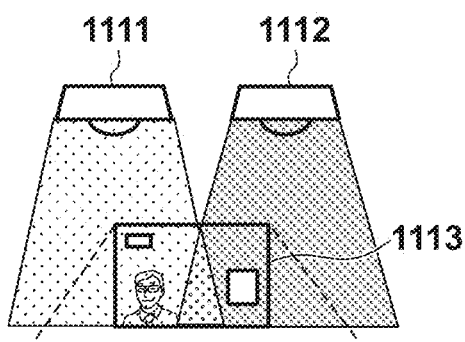
FIGS. 5A to 5G are schematic diagrams for describing an example of an area of interest.
Figure 5B:
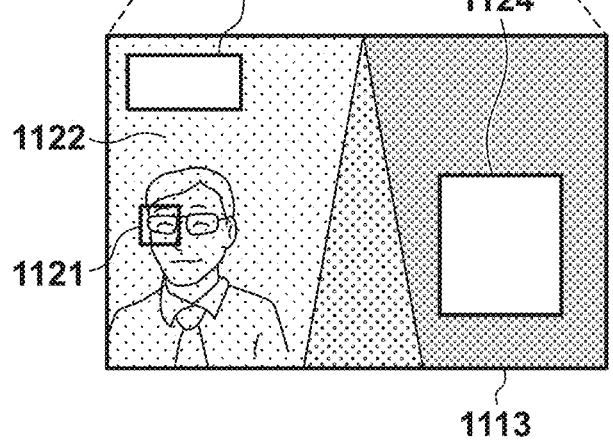

FIGS. 5A to 5G are schematic diagrams regarding acquisition of the area of interest in step S1001. FIG. 5A illustrates that a captured scene 1113 is illuminated by a plurality of light sources 1111 and 1112. Also, FIG. 5B illustrates a state in which the focusing area in the captured scene 1113 is presented to a user by a focusing frame 1121. In this case, the CPU 103 can set the focusing area indicated by the focusing frame 1121 as the area of interest.

Figure 5C:
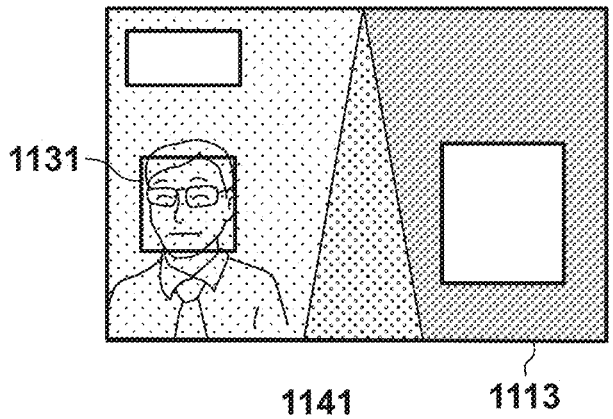

In FIG. 5C, the face region detected in the captured scene 1113 is presented to the user by a face frame 1131. In this case, the CPU 103 can set the face region indicated by the face frame 1131 as the area of interest.

Figure 5D:
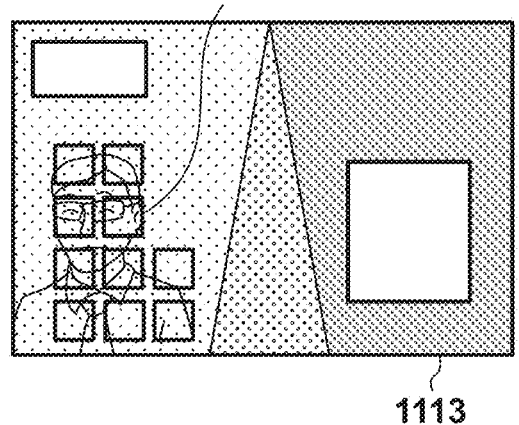

In FIG. 5D, an AF frame 1141 of an AF area that is in focus out of a plurality of AF areas in the captured scene 1113 is shown to the user. In this case, the CPU 103 can set the focusing area indicated by the AF frame 1141 as the area of interest.

In addition to those described here, the area of interest can be automatically determined based on a focusing area or a detected feature area. Also, the user may also set the area of interest. In this case, if the display unit 108 is a touch display, the CPU 103 can determine the area of interest based on the touch operation performed on a live view screen. Alternatively, the CPU 103 may display a movable frame for designating the area of interest on a live view image in a superimposed manner, and determine the area corresponding to the position of the frame designated through the console unit 109 as the area of interest. Upon determining the area of interest, in step S1002, the CPU 103 calculates the white balance coefficient. For example, the CPU 103 acquires the color temperature regarding the area of interest determined in step S1001 from the color temperature map that has already been generated regarding the captured scene 113, and can calculates the white balance coefficient based on the acquired color temperature. For example, when the area corresponding to the focusing frame 1121 in FIG. 5B is determined as the area of interest, the color temperature of a light source 1111 is set with respect to the area corresponding to the area of interest in the color temperature map. Therefore, the CPU 103 calculates a white balance coefficient corresponding to the color temperature of the light source 1111. Note that the processing shown in the flowchart in FIG. 4 may be executed by the image processing unit 105.

In the present embodiment, the white balance coefficient suitable for the area of interest can be calculated using the color temperature map. Therefore, in a captured scene in which light sources whose color temperatures are different are present, the white balance control appropriate for the user intention can be realized.

Third Embodiment

Next, a third embodiment will be described. In the present embodiment, a case where the color temperature set in the color temperature map generated in the first embodiment is different from the actual color temperature is considered. Such a state may occur when the color temperature of an interactive light source has changed due to degradation over time or the color temperature of reflected light changes from the color temperature of a light source due to an influence of a subject color.

When the color temperature set in the color temperature map is different from the actual color temperature, the CPU 103 retrieves an area, in the captured image, regarding which the color temperature that is the same as or close to that of an area of interest (area indicated by the focusing frame 1121 in FIG. 5B) is set from the color temperature map, for example. Then, the CPU 103 can estimate the color temperature by detecting a white area (area 1123) from the retrieved area (e.g., area 1122 in FIG. 5B), similarly to step S204 in the first embodiment.

As a result of executing white detection in an area regarding which a color temperature that is the same as that of the area of interest is set using the color temperature map, in this way, the white balance coefficient can be calculated without being influenced by a white area (e.g., area 1124) regarding which another color temperature is set. Therefore, more accurate white balance control can be realized.

Note that, in the present embodiment, an example in which the color temperature by area can be directly (or indirectly) obtained from the color temperature map is illustrated, but the information regarding the absolute value of the color temperature may not be needed. For example, if it is possible to identify an area that is illuminated by a light source having an unknown color temperature, the white balance coefficient can be calculated by performing white detection in the area.

In the present embodiment, an appropriate white balance coefficient can be calculated even when the color temperature or the color temperature map is different from the actual color temperature and when the color temperature of the light source is unknown.

Fourth Embodiment

Next, a fourth embodiment will be described. In the second and third embodiments, an example in which the influence of color temperatures of areas other than the area of interest are removed has been described. However, there may be cases where the white balance coefficient calculated based on only the color temperature of the area of interest may not be suitable for applying to the entire image.

Figure 5E:
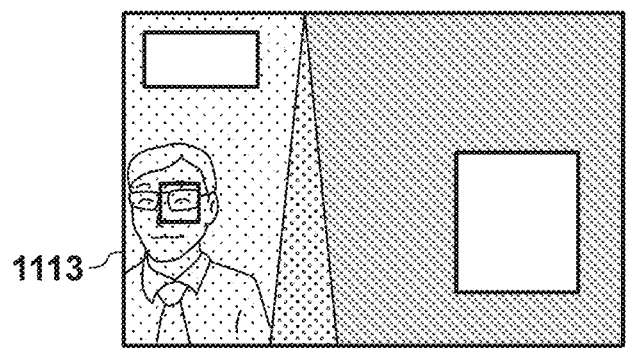

As shown in FIG. 5E, for example, there are cases where a large portion of the captured scene is illuminated by a light source 1112 having a color temperature different from that of the light source 1111 that illuminates the area of interest. In this case, if the white balance coefficient calculated based on the color temperature that is set regarding the area of interest in the color temperature map is applied to the entire image, the portion that is illuminated by the light source 1112 may be seen as unnatural in terms of the color. In such a case, a color temperature for obtaining a white balance coefficient suitable for applying to the entire image is calculated considering the color temperatures of the plurality of light sources that illuminate the captured scene 1113.

For example, the color temperature of the light source 1111 is denoted as K1, the size of the area that is illuminated by the light source 1111 inside the captured scene 1113 is denoted as S1, the color temperature of the light source 1112 is denoted as K2, and the size of the area that is illuminated by the light source 1112 inside the captured scene 1113 is denoted as S2. In this case, the CPU 103 calculates the color temperature K using the following Formula 2.

$$\text{Color temperature } K=(K1\times S1\times(+K2\times S2)/(S1\times(+S2) \quad \text{(Formula 2)}$$

Here, a is a priority coefficient of the area of interest 1121, and shows the weight of a light source that illuminates the area of interest 1121 regarding the color temperature. As a result of setting the priority coefficient α to a value that is larger than 1, a color temperature K in which the area of interest is focused on can be obtained. The priority coefficient α can be determined considering the type of the area of interest (e.g., in the case of the face of a person, a larger value is set than other cases) and the size of the area of interest (e.g., the larger the area of interest is, the larger value is set to a). Alternatively, a may be dynamically changed by a user. In this case, the user can change a through the console unit 109 such that the white balance that is preferable to the user is obtained while observing the live view image. Also, the configuration may be such that the calculation of the color temperature K by Formula 2 is executed only when the ratio of the area, with respect to the entirety of the color temperature map, regarding which a color temperature that is different from that of the area of interest is set is a threshold value or more.

As a result of calculating the white balance coefficient based on the color temperature K that is calculated using Formula 2, even when most parts of the captured scene have color temperatures of illumination that are different from that of the area of interest, the white balance control appropriate to the entire image can be realized.

Fifth Embodiment

Next, a fifth embodiment will be described. In the present embodiment, the calculation method of the color temperature to be used for calculating the white balance coefficient when the area of interest is selected from a plurality of candidate areas will be described.

Figure 5F:
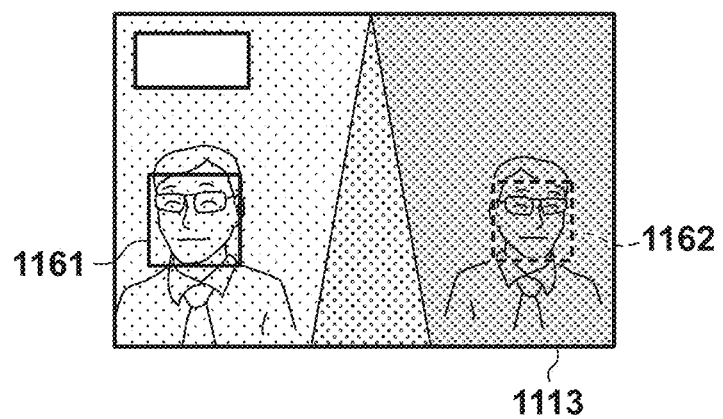

FIG. 5F shows a state in which a plurality of face regions 1161 and 1162 are detected from the captured image, and the face region 1161 is brought into focus. Also, the setting is assumed to be configured such that a face region is determined as the area of interest. In this case, the CPU 103 selects the face region 1161 that is brought into focus as the ultimate area of interest from the face regions 1161 and 1162 that are the plurality of candidate areas, and calculates the white balance coefficient. In such a case, if a candidate area on which illumination having a color temperature different from that of the area of interest is performed is present in the candidate areas that are not selected, the white balance coefficient can be calculated considering this fact.

The CPU 103 can calculate the color temperature K using the following Formula 3 in which a priority coefficient β regarding the other face region 1162 is added to Formula 2 that is used in the fourth embodiment, for example.

$$\text{Color temperature } K=(K1\times S1\times\alpha+K2\times S2\times\beta)/(S1\times\alpha+S2\times\beta) \quad \text{(Formula 3)}$$

Here, as a result of setting the priority coefficient β to a value that is smaller than 1, the influence of the other face region 1162 can be reduced. The priority coefficient β can also be determined from the size of the face region 1162 (the larger the size, a value closer to 1 is set) and the depth difference from the face region 1161 that is brought into focus (the larger the depth difference, the smaller value than 1 is set), for example.

As a result of calculating the white balance coefficient based on the color temperature K calculated using Formula 3, when a plurality of candidates of the area of interest are present, a white balance coefficient can be calculated considering a candidate area that has not been determined as the area of interest.

Sixth Embodiment

Next, a sixth embodiment will be described. In the present embodiment, the calculation method of the color temperature to be used for calculating the white balance coefficient when the area of interest includes areas with respect to which different color temperatures are set in the color temperature map will be described.

Figure 5G:
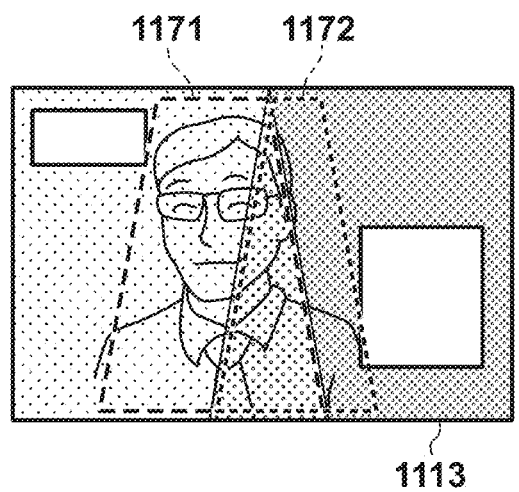

FIG. 5G shows a state in which the subject area, which is the area of interest, is present across an area 1171 illuminated by the light source 1111 and an area 1172 illuminated by the light source 1112. Here, the color temperature of the light source 1111 is denoted as K1, the size of the area 1171 illuminated by the light source 1111 inside the subject area is denoted as Sa, the color temperature of the light source 1112 is denoted as K2, the size of the area 1172 illuminated by the light source 1112 inside the captured scene is denoted as Sb. In such a case, the CPU 103 can calculate the color temperature K using the following Formula 4.

$$\text{Color temperature } K=(Ka\times Sa+Kb\times Sb)/(Sa+Sb) \quad \text{(Formula 4)}$$

As a result of calculating the white balance coefficient based on the color temperature K that is calculated using Formula 4, even when the area of interest includes areas with respect to which different color temperatures are set in the color temperature map, an appropriate white balance coefficient can be calculated.

Seventh Embodiment

Next, a seventh embodiment will be described. In the present embodiment, white balance control by area using the color temperature map will be described.

The color temperature map in FIG. 6 is a schematic diagram illustrated based on color temperatures set for respective areas. An area A 2001, an area B 2002, an area C 2003, and an area D 2004 indicate respective areas with respect to which different color temperatures are set. Regarding each area of the color temperature map, light source information is set such as luminance of a light source that illuminates the area, an acquisition method of the color temperature of the light source, and a (correlated) color temperature. Pieces of light source information 2005 to 2008 are respectively pieces of light source information of the area A 2001 to area D 2004. Here, the luminance of a light source is shown as a ratio (%) when the dynamic range of the image sensor 102 is set as 100%. Also, the acquisition method of the color temperature is white detection (step S204) or color temperature identification (step S205) with respect to the non-interactive light source 202, and acquisition by communication (acquisition by optical wireless communication or wireless communication when establishing connection in step S207) with respect to the interactive light source 201.

A case of being divided by area and a case of being not divided by area are conceivable regarding the color temperature map, and the case of being divided by area will be described in the following. The color temperature map divided by area can be created by repeating processing in which a continuous area whose (correlated) color temperature is a predetermined threshold value or less centered about a point (pixel, area) at which the luminance is highest in the area before being divided by area is set as an area of the same color temperature, until no area that is not sorted is present FIGS. 7A and 7B are flowcharts regarding the white balance control by area, and FIG. 7A is an overall flowchart and FIG. 7B is a flowchart illustrating the details of step S2009.

In step S2009, the CPU 103 calculates light source reliability for each area of the color temperature map. Note that the light source reliability shows the credibility of the (correlated) color temperature information that is set to the color temperature map with a numerical value.

The specific processing in step S2009 will be described using the flowchart in FIG. 7B.

In step S2015, the CPU 103 calculates, for each area, using the luminance information of light sources included in the light source information 2005 to 2008, the contribution ratio of the interactive light sources 201 in light illuminating the area. Note that the contribution ratio of an interactive light source is constituted by two elements, namely the ratio of illumination intensity of the interactive light source relative to that of all of the light sources, and the light amount accumulated in the image sensor 102.

The both of two elements for determining the contribution ratio of the interactive light source are reflected on the luminance information of each light source, and therefore, when the luminance of an interactive light source i is expressed by Yi (%), the contribution ratio Ra (%) of the interactive light sources can be calculated using Formula 5.

$Ra = \Sigma Yi$ (Formula 5)

In step S2016, the CPU 103 calculates the light source reliability using the contribution ratio of the interactive light sources for each area. The light source reliability Re_i of an area i is calculated using Formula 6 so as to be 100% when a contribution ratio Ra_i of the interactive light source is a predetermined reliable threshold value Th (%) or more.

$Re\_i = MIN[100 \times Ra\_i/Th, 100]$ (Formula 6)

In the estimation of color temperature by detecting a white area such as that performed in step S204 in FIG. 2, an area that is considered to be white is detected from an image, and it is difficult to distinguish between a white subject that is illuminated by a light source having a low color temperature and a red subject that is illuminated by a light source having a high color temperature, for example, and therefore it is possible that a white area is erroneously detected. Therefore, in the present embodiment, the light source reliability is calculated from the contribution ratio of the interactive light sources from which highly accurate color temperature can be acquired without depending on information obtained from a captured image.

Note that, out of the interactive light sources 201, the interactive light source having an optical communication function may be handled such that the accuracy of the color temperature that can be acquired therefrom is higher than that from an interactive light source that does not have an optical communication function. For example, the contribution ratio of the interactive light source having an optical communication function and the contribution ratio of the interactive light source that does not have an optical communication function are separately obtained, and the ultimate light source reliability may be calculated by performing weighted addition in which the weight of the former is larger.

In step S2017, the CPU 103 reflects the influence of an external factor (noise component) on the light source reliability. Examples of the noise component includes a saturated area of the image sensor 102, a point light source, and sensor noise, but there is no limitation thereto, and the noise component collectively indicate noise components that cause the accuracy of the color temperature map to drop. Here, the CPU 103 specifies, in the color temperature map, an area whose size is smaller than a predetermined threshold value as a noise area.

The size of an area that is not a noise area is denoted by Sa, the size of a noise area i is denoted as Sn_i, the light source reliability on which a noise component has not been reflected is denoted as Re_a, and the light source reliability on which a noise component has been reflected is denoted as Re_b. The CPU 103 calculates the light source reliability Re_a on which a noise component is reflected using the following Formula 7.

$Re\_a = Re\_b \times Sa / (\Sigma Sn\_i + Sa)$ (Formula 7)

For example, the light source reliability on which the noise component of the area B 2002 is reflected is 19.8%, when the area D 2004 is a noise area, the size of the area B 2002 is 990, and the size of the area D 2004 is 10.

In step S2018, the CPU 103 performs weighting on the light source reliability due to change over time of the color temperature map.

a to c in FIG. 8 schematically illustrate one example of the change over time of the color temperature map. When an area regarding which a certain color temperature is set changes over time as shown from 2020 to 2021, and 2022, the CPU 103 changes the light source reliability according to the shooting mode. Specifically, the CPU 103 performs weighting such that the light source reliability regarding an area whose size changes over time is decreased in order to suppress the change between captured images that have been successively shot over the period from a to c in FIG. 8 such as still images shot in a consecutive shooting mode or a moving image. Specifically, the weight can be set to 0 or a predetermined value of less than 1. Note that with respect to images that are not successively shot such as still images that are shot in a shooting mode other than the consecutive shooting mode and the moving image mode, image quality is highly prioritized and weighting that causes the light source reliability to drop is not performed.

Next, in step S2019, the CPU 103 performs weighting on the light source reliability using a distance map. Note that the method of generating the distance map is not specifically limited, and a known method can be used. The distance map is information that represent the subject distance for each pixel, and may be a depth map (may be called as a distance image, a depth image, or the like) in which the luminance value represents the distance. For example, the subject distance can be obtained for each pixel by obtaining, for each pixel, the focus lens position at which the contrast evaluation value obtained in the image processing unit 105 is largest. Also, the pixel-wise distance map can also be obtained based on the correlation between the amount of bokeh and the distance that is obtained from the image data obtained by shooting the same scene a plurality of times while changing the in-focus distance and the point spread function (PSF) of the optical system. These techniques are described in Japanese Patent Laid-Open No. 2010-17741 and U.S. Pat. No. 4,965,840, and the like. Also, when an image sensor that can acquire a parallax image pair is used, the subject distance can be obtained for each pixel using a method such as stereo matching.

Figure 9B:
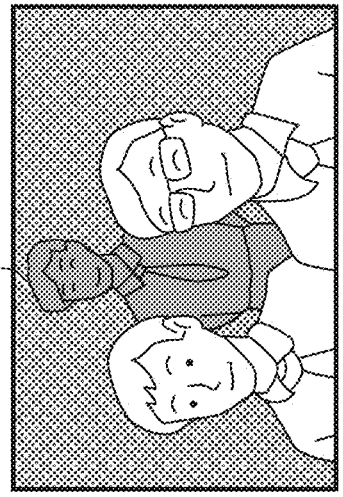
FIGS. 9AA to 9CC are schematic diagrams regarding weighting of light source reliability based on a color temperature map and a distance map.
Figure 9B:
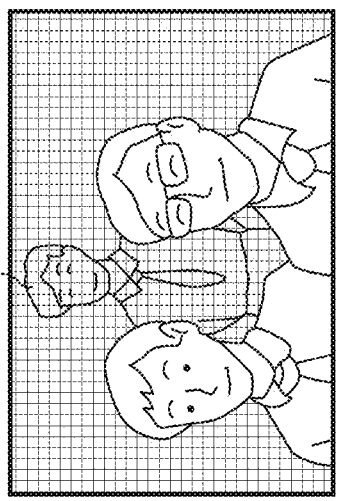
Figure 9B:
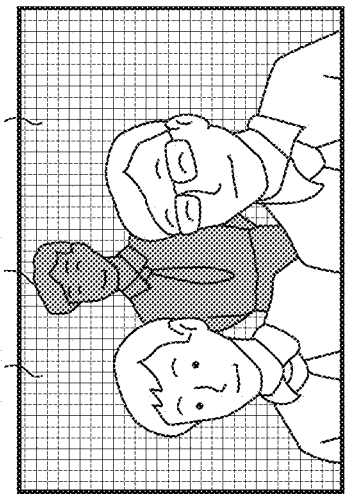
Figure 9C:
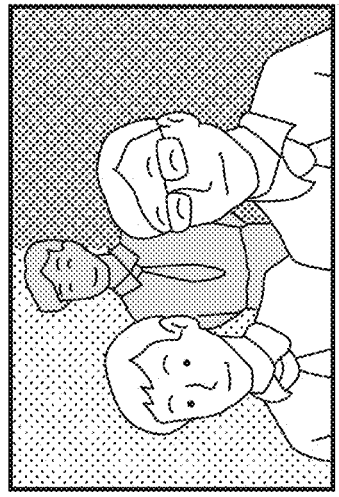
Figure 9C:
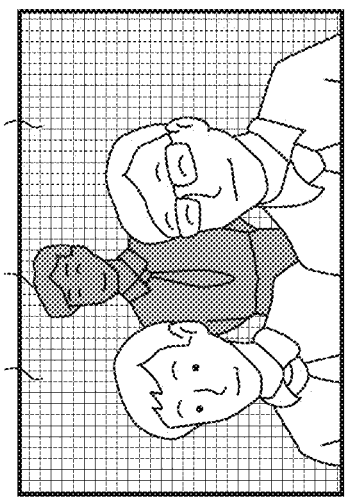
Figure 9C:
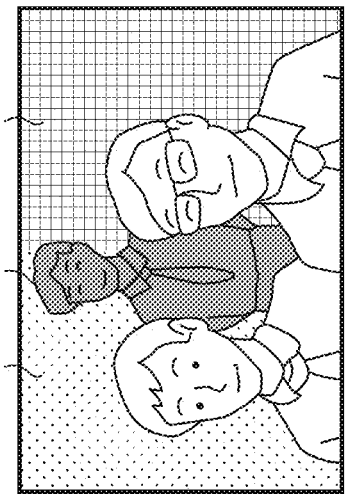

FIG. 9AA to FIG. 9CC are diagrams illustrating a weighting method of light source reliability based on the color temperature map and the distance map.

FIGS. 9AA to 9AC illustrate a case where the color temperature map matches the distance map, and the light source reliability is not influenced.

FIGS. 9BA to 9BC illustrate a case where the color temperature map does not match the distance map, and the light source reliability drops. FIGS. 9CA to 9CC illustrate a case where although the color temperature map does not match the distance map, the light source reliability does not drop.

Note that FIGS. 9AA, 9BA, and 9CA show color temperature maps, FIGS. 9AB, 9BB, and 9CB show distance maps, and FIGS. 9AC, 9BC, and 9CC show light source reliabilities. Also, it is assumed that, in the distance map, the areas shown by the same pattern represent the same distance, and with respect to the light source reliability, being closer to white indicates higher reliability, and being closer to black indicates lower reliability. Note that the distance map may be divided by area assuming that closer distances are approximated to the same distance, similarly to the color temperature map.

First, FIGS. 9AA to 9AC will be described. Because the boundaries match between the color temperature map (FIG. 9AA) and the distance map (FIG. 9AB), it is conceivable that the color temperature map (FIG. 9AA) is correctly detected. Therefore, the CPU 103 determines that the weighting on the light source reliability is not needed. As a result, the light source reliabilities before weighting and after weighting are each shown by FIG. 9AC.

Next, FIGS. 9BA to 9BC will be described. The color temperature map (FIG. 9BA) is divided by area such that an area 2023 is sandwiched between areas 2024 and 2025 whose color temperatures are different from that of the area 2023. On the other hand, in the distance map (FIG. 9BB), the area corresponding to the areas 2023 to 2025 in the color temperature map is constituted by one distance area 2026, and it can be understood that there is a difference between the maps. Considering the property of the light sources, the state in which, with respect to subjects at the same distance, an area illuminated by a light source having one color temperature is present between areas illuminated by a light source having a color temperature different from the one color temperature is not easily achieved, and therefore the CPU 103 determines to perform weighting so as to decrease the light source reliability. When FIG. 9AC shows the light source reliability before weighting and FIG. 9BC shows the light source reliability after weighting, the light source reliability 2027 regarding the area 2023 drops as a light source reliability 2028, for example, by weighting.

Finally, FIGS. 9CA to 9CC will be described. In the color temperature map (FIG. 9CA), color temperatures that are different to each other are respectively set to areas 2029, 2030, and 2031, which constitute the entire area. On the other hand, in the distance map (FIG. 9CB), areas 2033 and 2034 corresponding to the areas 2030 and 2031 in the color temperature map are set as areas at the same distance. In this case, although the distances of the areas 2033 and 2034 in the distance map are the same, when the area 2032 is closer than the area 2033, light is blocked by the subject in the area 2032, and therefore the state shown in the color temperature map may be achieved. Therefore, the CPU 103 determines that the weighting on the light source reliability is not needed. As a result, the light source reliabilities before weighting and the weighting are each shown as FIG. 9CC.

As described above, the CPU 103 performs weighting on the area-wise light source reliability by comparing the distance map and the color temperature map.

Returning to FIG. 7A, in step S2010, the CPU 103 determines whether or not the light source reliability of each of all of the areas is less than a threshold value in order to determine whether or not the white balance control is to be performed for each area. The CPU 103, if it is determined that the light source reliabilities of all areas are less than the threshold value, executes step S2011, and if it is determined that an area regarding which the light source reliability is the threshold value or more is present, executes step S2012.

It is conceivable that with respect to the area regarding which the light source reliability is less than the threshold value, the possibility that the color temperature is erroneously detected is high. When area-wise white balance control is performed when the light source reliability is low regarding all of the areas, it is possible that the color balance of the entire image collapses. Therefore, if it is determined that the light source reliabilities of all areas are less than the threshold value, the CPU 103, in step S2011, applies a white balance coefficient calculated based on white areas detected from the entire screen using the image processing unit 105 to the entire image.

On the other hand, in step S2012, the CPU 103 calculates a white balance coefficient (hereinafter, referred to as a "partial WB coefficient") for an area regarding which the light source reliability is the threshold value or more, in order to separately apply white balance control to the area.

The partial WB coefficient may be calculated in units of minimum area of the color temperature map, or may be calculated in units of area after area division as shown in FIG. 6. In the former case, the CPU 103 uses the (correlated) color temperatures when the color temperature map was created as is for the respective areas. Also, in the latter case, the CPU 103 uses the (correlated) color temperature at a point, inside the area, at which the luminance is highest that is calculated when the area division was performed. Note that, in the latter case, the color temperature may be calculated by performing weighted averaging, with the luminance, on the (correlated) color temperatures regarding all minimum areas included in each area. The method of obtaining the white balance from the (correlated) color temperature is known, and therefore the description thereof is omitted here.

In step S2013, the CPU 103 calculates a white balance coefficient (hereinafter, referred to as an "overall WB coefficient") to be commonly applied to areas regarding which the light source reliability is less than the threshold value. If the overall WB coefficient is calculated based on white areas detected from the entire screen, similarly to step S2011, the overall WB coefficient is influenced by the areas to which the partial WB coefficients are applied. Therefore, the CPU 103 controls the image processing unit 105 so as to calculate the white balance coefficient by detecting white areas from areas regarding which the light source reliability is less than the threshold value.

In step S2014, the CPU 103 applies the white balance coefficients calculated in steps S2012 and S2013 to the respective areas using the image processing unit 105. Basically, the partial WB coefficient and the overall WB coefficient need only be selectively applied to each area, but the WB coefficient may be caused to gradually change regarding boundary portions in order to make the boundary between the area to which the partial WB coefficient is applied and the area to which the overall WB coefficient is applied is inconspicuous.

FIG. 10 is a diagram illustrating an example of the mixing ratio between the partial WB coefficient and the overall WB coefficient according to the light source reliability. The horizontal axis in FIG. 10 shows the light source reliability, and the vertical axis shows the mixing ratio between the partial WB coefficient and the overall WB coefficient. When the light source reliability is less than a threshold value a, only the overall WB coefficient is used. When the light source reliability is the threshold value a or more, the ratio of the partial WB coefficient becomes larger than 0%. Also, in an area regarding which the light source reliability is a threshold value b or more, only the partial WB coefficient is used. The overall WB coefficient is calculated from areas regarding which the light source reliability is less than the threshold value b. As a result of using the WB coefficient obtained by combining the partial WB coefficient and the overall WB coefficient according to the mixing ratio shown in FIG. 10, the boundary between the area to which the partial WB coefficient is applied and the area to which the overall WB coefficient is applied can be made inconspicuous.

According to the present embodiment, as a result of appropriately using the partial WB coefficient and the overall WB coefficient that are to be used for the white balance control processing by area according to the light source reliability regarding the area, collapsing of the color balance that occurs as a result of performing the white balance control by area on the entire screen can be suppressed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-033750, filed on Feb. 28, 2020 which is hereby incorporated by reference herein in its entirety.

What is claimed is:

1. An image processing apparatus that generates, from a captured image, a color temperature map that indicates color temperature information of light illuminating a captured scene for each area, comprising:
   one or more processors that execute a program stored in a memory and thereby function as:
   a determining unit configured to determine, for each area of the captured image, either an interactive light source that has a communication function, a non-interactive light source that does not have a communication function, or both of the interactive light source and the non-interactive light source is a light source that illuminates a corresponding area in the captured scene; and
   a generating unit configured to generate the color temperature map using: a result of determination made by the determining unit, color temperature information acquired from the interactive light source through communication, and color temperature information of the non-interactive light source that is estimated based on the captured image.

2. The image processing apparatus according to claim 1, wherein the one or more processors further function as:
   an estimating unit configured to estimate color temperature information of the non-interactive light source,
   wherein the estimating unit estimates the color temperature information of the non-interactive light source by detecting a white area from the captured image.

3. The image processing apparatus according to claim 2, wherein the estimating unit estimates the color temperature information of the non-interactive light source by detecting a white area from an area, in the captured image, that corresponds to an area, in the captured scene, that is illuminated by the non-interactive light source and is not illuminated by the interactive light source.

4. The image processing apparatus according to claim 2, wherein the estimating unit
   acquires, with respect to each of captured images obtained in states in which the color temperature of the interactive light source are different, a difference between:
   a color evaluation value with respect to an area, in the captured image, that corresponds to an area, in the captured scene, that is illuminated by the non-interactive light source and is not illuminated by the interactive light source; and a color evaluation value with respect to an area, in the captured image, that corresponds to an area, in the captured scene, that is illuminated by the interactive light source, and estimates the color temperature information of the non-interactive light source based on change in the acquired differences.

5. The image processing apparatus according to claim 1, wherein the one or more processors further function as:
a calculating unit configured to calculate a white balance coefficient to be applied to the captured image using the color temperature map; and
an applying unit configured to apply the white balance coefficient to the captured image.

6. The image processing apparatus according to claim 5, wherein the calculating unit calculates the white balance coefficient based on color temperature information that corresponds to an area of interest of the captured image and that is acquired using the color temperature map.

7. The image processing apparatus according to claim 6, wherein the calculating unit calculates the white balance coefficient based on a white area, in the captured image, detected from an area, in the color temperature map, having color temperature information that is the same as that of the area of interest.

8. The image processing apparatus according to claim 5, wherein the calculating unit calculates the white balance coefficient based on color temperature information obtained by performing weighted addition on pieces of color temperature information using weights according to the sizes of areas having the same color temperature information in the color temperature map.

9. The image processing apparatus according to claim 8, wherein, in the weighted addition, the weight of color temperature corresponding to an area of interest in the captured image is increased.

10. The image processing apparatus according to claim 9, wherein, in a case where the area of interest is selected from a plurality of candidate areas, and there is a candidate area having different color temperature information, in the color temperature map, from that of the area of interest among candidate areas that are not selected, the calculating unit calculates the color temperature information using a weight regarding the candidate area that is not selected.

11. The image processing apparatus according to claim 6, wherein the calculating unit, when a plurality of pieces of color temperature information are set regarding the area of interest in the color temperature map, calculates the white balance coefficient based on color temperature information obtained by adding the plurality of pieces of color temperature information according to the sizes of areas corresponding to the respective pieces of color temperature information.

12. The image processing apparatus according to claim 11, wherein the calculating unit, when obtaining the size, excludes the size of an area that is determined to be a noise component.

13. The image processing apparatus according to claim 5, wherein the calculating unit calculates a white balance coefficient for each area of the captured image using the color temperature map.

14. The image processing apparatus according to claim 13, wherein the calculating unit calculates, when the reliabilities of pieces of color temperature information in the color temperature map are all less than a predetermined threshold value, a white balance coefficient based on the entirety of the captured image in place of calculating a white balance coefficient for each area.

15. The image processing apparatus according to claim 14, wherein the calculating unit calculates the reliability of the color temperature information using a distance map corresponding to the captured image.

16. The image processing apparatus according to claim 14, wherein the calculating unit calculates a white balance coefficient for each area, with respect to areas that have the color temperature information whose reliability is the threshold value or more, out of the captured image.

17. The image processing apparatus according to claim 16, wherein the applying unit applies a white balance coefficient calculated for each area to areas that have the color temperature information whose reliability is the threshold value or more, out of the captured image, and applies a white balance coefficient calculated based on the entirety of the captured image to areas that have the color temperature information whose reliability is less than the threshold value.

18. The image processing apparatus according to claim 14, wherein the calculating unit decreases the reliability with respect to color temperature information, out of pieces of color temperature information of the color temperature map, regarding which the contribution ratio of an interactive light source is less than a predetermined threshold value.

19. The image processing apparatus according to claim 14, wherein the calculating unit decreases the reliability of color temperature information with respect to an area regarding which the color temperature information changes over time, out of the color temperature map.

20. The image processing apparatus according to claim 19, wherein the calculating unit does not decrease the reliability of color temperature information with respect to an area regarding which the color temperature information changes over time, if the captured image is not a moving image or a still image that has been shot in a consecutive shooting mode.

21. An image capture apparatus comprising:
an image sensor; and
an image processing apparatus that generates, from a captured image obtained by the image sensor, a color temperature map that indicates color temperature information of light illuminating a captured scene for each area,
wherein the image processing apparatus comprises:
one or more processors that execute a program stored in a memory and thereby function as:
a determining unit configured to determine, for each area of the captured image, either an interactive light source that has a communication function, a non-interactive light source that does not have a communication function, or both of the interactive light source and the non-interactive light source is a light source that illuminates a corresponding area in the captured scene; and
a generating unit configured to generate the color temperature map using: a result of determination made by the determining unit, color temperature information acquired from the interactive light source through communication, and color temperature information of the non-interactive light source that is estimated based on the captured image.

22. The image capture apparatus according to claim 21, wherein the image capture apparatus includes optical communication sensors for receiving a signal from an interactive light source having an optical communication function, and the optical communication sensors are regularly arranged in a pixel array included in the image sensor.

23. An image processing method for generating, from a captured image, a color temperature map in that indicates color temperature information of light illuminating a captured scene for each area, the image processing method comprising:
   determining, for each area of the captured image, either an interactive light source that has a communication function, a non-interactive light source that does not have a communication function, or both of the interactive light source and the non-interactive light source is a light source that illuminates a corresponding area in the captured scene; and
   generating the color temperature map using a result of the determination, color temperature information acquired from the interactive light source through communication, and color temperature information of the non-interactive light source that is estimated based on the captured image.

24. A non-transitory computer-readable medium storing a program for causing a computer to execute an image processing method for generating, from a captured image, a color temperature map in that indicates color temperature information of light illuminating a captured scene for each area, the image processing method comprising:
   determining, for each area of the captured image, either an interactive light source that has a communication function, a non-interactive light source that does not have a communication function, or both of the interactive light source and the non-interactive light source is a light source that illuminates a corresponding area in the captured scene; and
   generating the color temperature map using a result of the determination, color temperature information acquired from the interactive light source through communication, and color temperature information of the non-interactive light source that is estimated based on the captured image.

* * * * *